United States Patent [19]
Saito et al.

[11] Patent Number: 5,844,874
[45] Date of Patent: Dec. 1, 1998

[54] DISC TRAY HAVING A DISC HOLDING MEMBER

[75] Inventors: Koji Saito, Saitama-ken; Fumiaki Kishimoto; Hirofumi Hayashi, both of Kanagawa-ken, all of Japan

[73] Assignee: Kabushiki Kaisha Toshiba, Kawasaki, Japan

[21] Appl. No.: 605,887

[22] Filed: Feb. 23, 1996

[30] Foreign Application Priority Data

Feb. 24, 1995 [JP] Japan ................................. 7-036706
Feb. 24, 1995 [JP] Japan ................................. 7-036707

[51] Int. Cl.$^6$ ...................................................... G11B 7/00
[52] U.S. Cl. ........................................ 369/75.2; 369/77.1
[58] Field of Search ................................ 369/75.2, 77.1

[56] References Cited

U.S. PATENT DOCUMENTS 4,710,910  12/1987  Ejiri ........................................ 369/75.2
5,142,523   8/1992  Kamoshita .............................. 369/75.2

FOREIGN PATENT DOCUMENTS 0 129 292  12/1984  European Pat. Off. .
0 145 051   6/1985  European Pat. Off. .
0 265 897   5/1988  European Pat. Off. .
0 315 255   5/1989  European Pat. Off. .
6-111444    4/1994  Japan .

*Primary Examiner*—Stuart S. Levy
*Assistant Examiner*—David D. Davis
*Attorney, Agent, or Firm*—Cushman Darby & Cushman IP Group of Pillsbury Madison & Sutro LLP

[57] ABSTRACT

A disc player according to the first aspect of the aspect of the present invention includes present invention has a disc holding member movable in parallel to the surface of the disc tray for holding the disc in corporation with the disc tray at least when the disc tray is placed outside the disc player and a disc hold releasing member for disengaging the disc holding member from the disc placed on the disc tray in the course of the disc tray moving toward a prescribed reproducing position in the disc player.

10 Claims, 19 Drawing Sheets

DISC TRAY HAVING A DISC HOLDING MEMBER

FIELD OF THE INVENTION

The present invention relates to a disc player such as a CD (compact disc) player or CD-ROM drive.

BACKGROUND INFORMATION

In recent years, disc players such as CD-ROM drives to be used in a computer have become more popular as the disc player has become more miniaturized and lightweight. For instance, a disc player has been constructed with a disc tray for loading or ejecting an optical disc moving in a vertical plane into or out of the disc player.

When the disc player loads and ejects the optical disc in a vertical plane, some measures have to be taken so that the disc is kept in an appropriate position on the disc tray. Also, the information carrying surface of the disc must be separable from the disc tray when the disc is driven. For instance, when the disc tray lies in a horizontal plane, the disc is driven after it is lifted up a little by a turntable from the disc tray. However, when a holding member and the disc tray hold both surfaces of the disc, the disc can not be lifted up from the disc tray due to the disc holding member. Further, when the disc is held by both of its surfaces, the operations of placing the detaching discs onto and from the disc tray become complicated.

SUMMARY OF THE INVENTION

It is, therefore, an object of the present invention to provide a disc tray and a disc player having a disc tray which can be loaded and ejected in both a horizontal and vertical position into and out of the disc player.

Another object of the present invention is to provide a disc player which is able to stably hold the disc in the appropriate position on the disc tray when the disc tray is loaded and ejected and to detach the disc placed on the disc tray when the disc is to be driven.

In order to achieve the above object, a disc player according to the first aspect of the present invention includes a disc holding member movable in parallel to the surface of the disc tray for holding the disc in cooperation with the disc tray at least when the disc tray is placed outside of the disc player and a disc hold releasing member for disengaging the disc holding member from the disc placed on the disc tray when the disc tray moves toward a prescribed reproducing position in the disc player.

The disc player according to the second aspect of the present invention which is capable of loading and ejecting a disc tray into and out of the disc player has a disc driving mechanism mounted in the disc player for detaching the disc from the disc tray loaded in the disc player in the direction perpendicular to the disc face and for driving the disc by holding the disc with both surfaces, a disc holding member movably mounted on the disc tray along a surface which is parallel to the surface of the disc placed on the disc tray for holding the disc in cooperation with the disc tray at least when the disc tray is placed outside of the disc player and a disc hold releasing means for disengaging the disc holding member from the disc placed on the disc tray in the course of the disc being detached from the disc tray loaded in the disc player by the disc driving mechanism.

The disc player according to the third aspect of the present invention which is capable of loading and ejecting a disc tray into and out of the disc player, has a disc holding member movable in parallel to the surface of the disc tray for holding the disc in cooperation with the disc tray at least when the disc tray is placed outside of the disc player and a disc hold releasing means for disengaging the disc holding member from the disc placed on the disc tray by bumping against the disc holding member in the course of the disc tray moving toward a prescribed disc reproducing position in the disc player.

The disc player according to the fourth aspect of the present invention which is capable of loading and ejecting a disc tray into and out of the disc player has a disc driving mechanism mounted in the disc player for detaching the disc from the disc tray loaded in the disc player in a direction generally perpendicular to the disc face and for driving the disc by holding the disc, a disc holding member movable in parallel to the surface of the disc tray for holding the disc in cooperation with the disc tray at least when the disc tray is placed outside of the disc player and a disc hold releasing member for disengaging the disc holding member from the disc placed on the disc tray when the disc is placed outside the disc tray.

The disc tray according to the fifth aspect of the present invention for loading the disc placed thereon into a disc player, has a disc receiving portion for receiving the disc, a disc holding member movable in parallel to the surface of the disc tray for holding the disc in cooperation with the disc receiving portion at least when the disc tray is placed outside of the disc player and a biasing member for biasing the disc holding member toward the holding position.

The disc tray according to the sixth aspect of the present invention for leading the disc placed thereon into a disc player, has a disc receiving portion for receiving the disc, a disc interposing member defined on one side of the tray along the tray loading direction for interposing the edge of the disc with the disc receiving portion, a disc holding member movable in parallel to the surface of the disc tray for holding the disc in cooperation with the disc receiving portion at least when the disc tray is placed outside of the disc player, and a biasing means for biasing the disc holding member toward the holding position.

Further to the disc tray of the fifth or sixth aspect of the invention, the disc tray has a fastener for fastening the disc holding member at the prescribed position where the disc holding is releasable.

In the first aspect of the invention, when the disc tray is placed outside the main body of the apparatus, the disc placed on the disc tray is held between the disc tray and the disc holding member. Then when the disc tray is carried to the prescribed reproducing position in the main body of the apparatus, the disc holding member moves to the position where the disc holding is released. If this apparatus is used in a vertical position, in other words, it is used as the disc is placed in a vertical position on the disc tray it is possible to carry the disc tray to the prescribed reproducing position in the main body of the apparatus while holding the disc stably in the appropriate position of the disc tray, and to detach the disc from the disc tray in the reproducing position and thereafter drive the disc.

In the second aspect of the invention when the disc tray is placed outside the main body of the apparatus, the disc placed on the disc tray is held between the disc tray and the disc holding member and when the disc is detached from the disc tray and loaded into the main body of the apparatus by the disc driving mechanism the disc holding member is moved to the position where the disc can be detached from the holding member by the disc hold releasing means, if this apparatus is used in a vertical position, in other words, it is used when the disc is placed in a vertical position on the disc tray it is possible to carry the disc tray to the prescribed reproducing position in the main body of the apparatus while holding the disc stably in the appropriate position of the disc tray, and to detach the disc from the disc tray in the reproducing position and thereafter drive the disc.

In the third aspect of the invention, when the disc tray is placed outside the main body of the apparatus the disc placed on the disc tray is held between the disc tray and the disc holding member. Thus when the disc tray is carried to the prescribed reproducing position in the main body of the apparatus the disc holding member is moved to the position where the disc holding is released by bumping against the disc hold releasing means. If this apparatus is used in a vertical position, in other words, it is used when the disc is placed in an almost vertical position on the disc tray it is possible to carry the disc tray to the prescribed reproducing position in the main body of the apparatus while holding the disc stably in the appropriate position of the disc tray, and to detach the disc from the disc tray in the reproducing position and thereafter drive the disc.

In the fourth aspect of the invention when the disc tray is placed outside of the main body of the apparatus, the disc placed on the disc tray is held between the disc tray and the disc holding member. Thus when the disc is detached from the disc tray loaded into the main body of the apparatus by the disc driving mechanism, the disc holding member is moved to the position where the disc holding is released by bumping with the disc hold releasing means. If this apparatus is used in a vertical position, in other words, it is used when the disc is placed in an almost vertical position on the disc tray it is possible to carry the disc tray to the prescribed reproducing position in the main body of the apparatus while holding the disc stably in the appropriate position of the disc tray, and to detach the disc from the disc tray in the reproducing position and thereafter drive the disc.

In the disc tray according to the fifth aspect of the invention when the tray is placed outside of the main body of the apparatus the disc is held stably on the disc loading surface with the disc clamping member. Accordingly, when the disc is loaded vertically the disc is held stably at the prescribed position on the tray. Further, the disc clamping member is able to move to the clamping releasing position against the bias of the bias means, so it is easy to take the disc in and out operation inside the disc player and outside thereof.

In the disc tray according to the sixth aspect of the invention when the tray is placed outside of the main body of the apparatus the disc is held stably on the disc loading surface with the disc clamping member and the disc interposing member. Accordingly, when the disc is loaded vertically the disc is held stably at the prescribed position on the tray. Further, the disc clamping member is able to move to the clamping releasing position against the bias of the bias means, so it is easy to take the disc in and out operation inside the disc player and outside. In the disc tray according to the third aspect of the invention when the disc is carried as it is laid horizontally since it is unnecessary to clamp the disc by the disc clamping member the disc clamping member is fixed at the clamp releasing position.

Additional objects and advantages of the present invention will be apparent to persons skilled in the art from a study of the following description and the accompanying drawings, which are hereby incorporated into and constitute a part of this specification.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
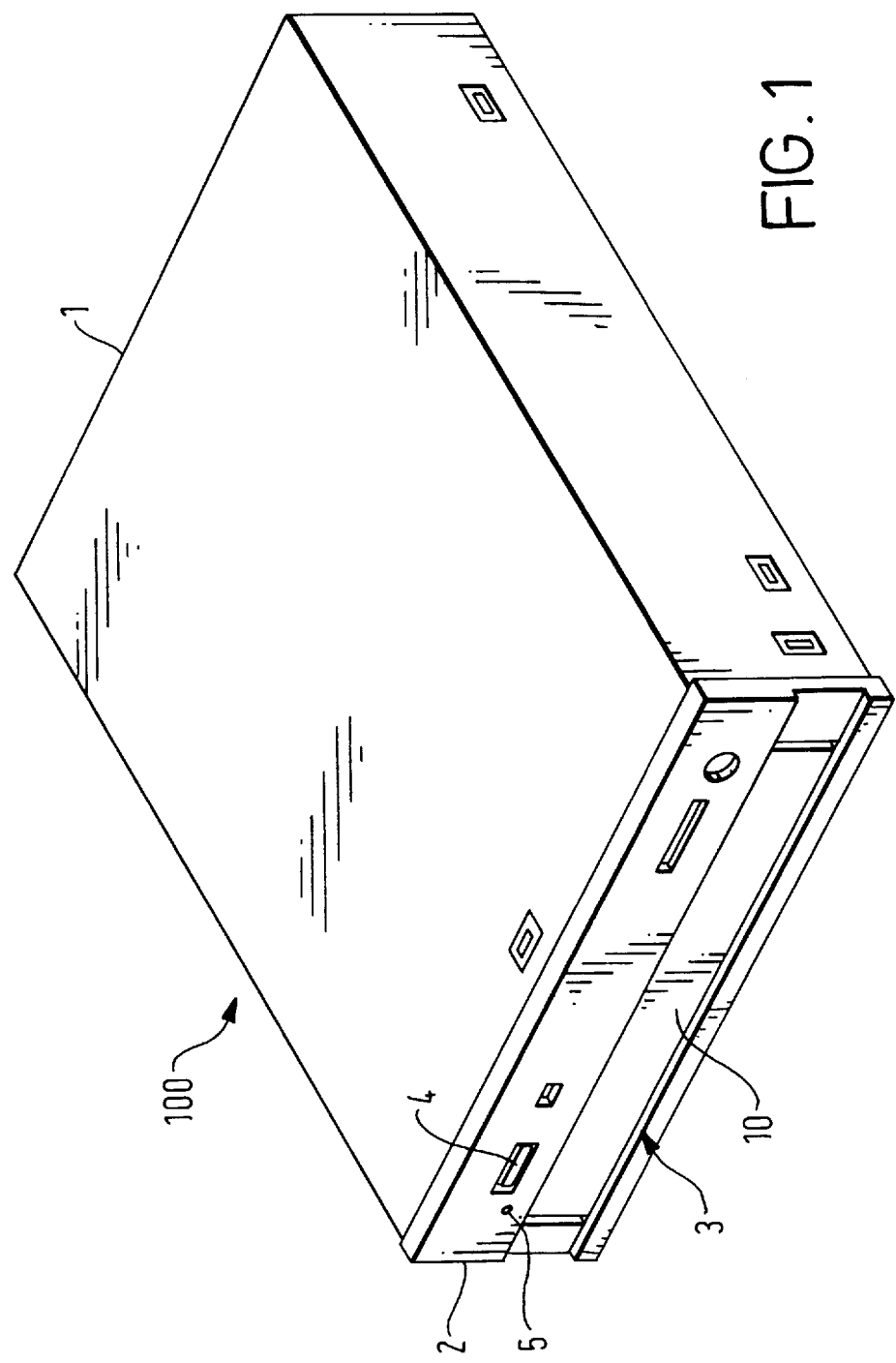
FIG. 1 is a perspective view for showing one embodiment of the optical disc player according to the present invention.

The present invention will be described in detail with reference to the attached drawings FIGS. 1 through 21.

Throughout the drawings, like or equivalent reference numerals or letters will be used to designate like or equivalent elements for simplicity of explanation.

Figure 2:
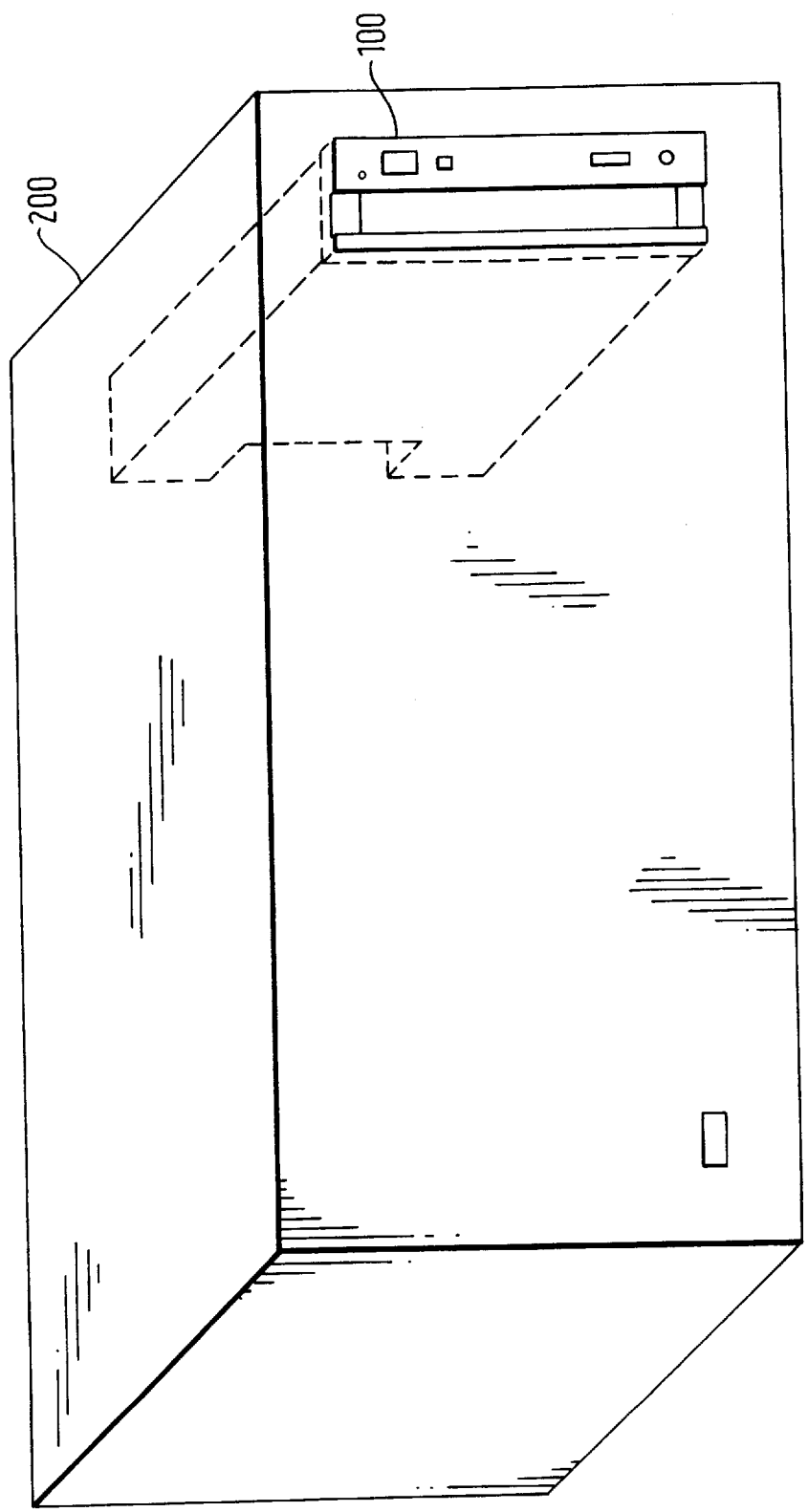
FIG. 2 is a perspective view for showing the method of assembling the optical disc player in FIG. 1 to an information processing apparatus.

FIG. 1 is a perspective view showing the externals of the disc player according to one embodiment of the present invention. The disc player 100 is incorporated in a vertical position, in other words the optical disc is incorporated in a vertical position into the main body of the information processing apparatus 200 such as a personal computer as shown in FIG. 2.

In FIG. 1, I denotes the cabinet, and 2 denotes a front panel. On the front panel 2 a disc tray entrance opening 3 for loading or ejecting a disc tray 10 having an optical disc thereon into and out of the cabinet 1, an ejection button 4 for electrically commanding the disc tray loading and ejecting and a small hole 5 for manually ejecting the disc tray 10 out the cabinet 1 where a wire or the like is inserted when the automatic driving system of the disc tray 10 has failed due to some troubles.

Figure 3:
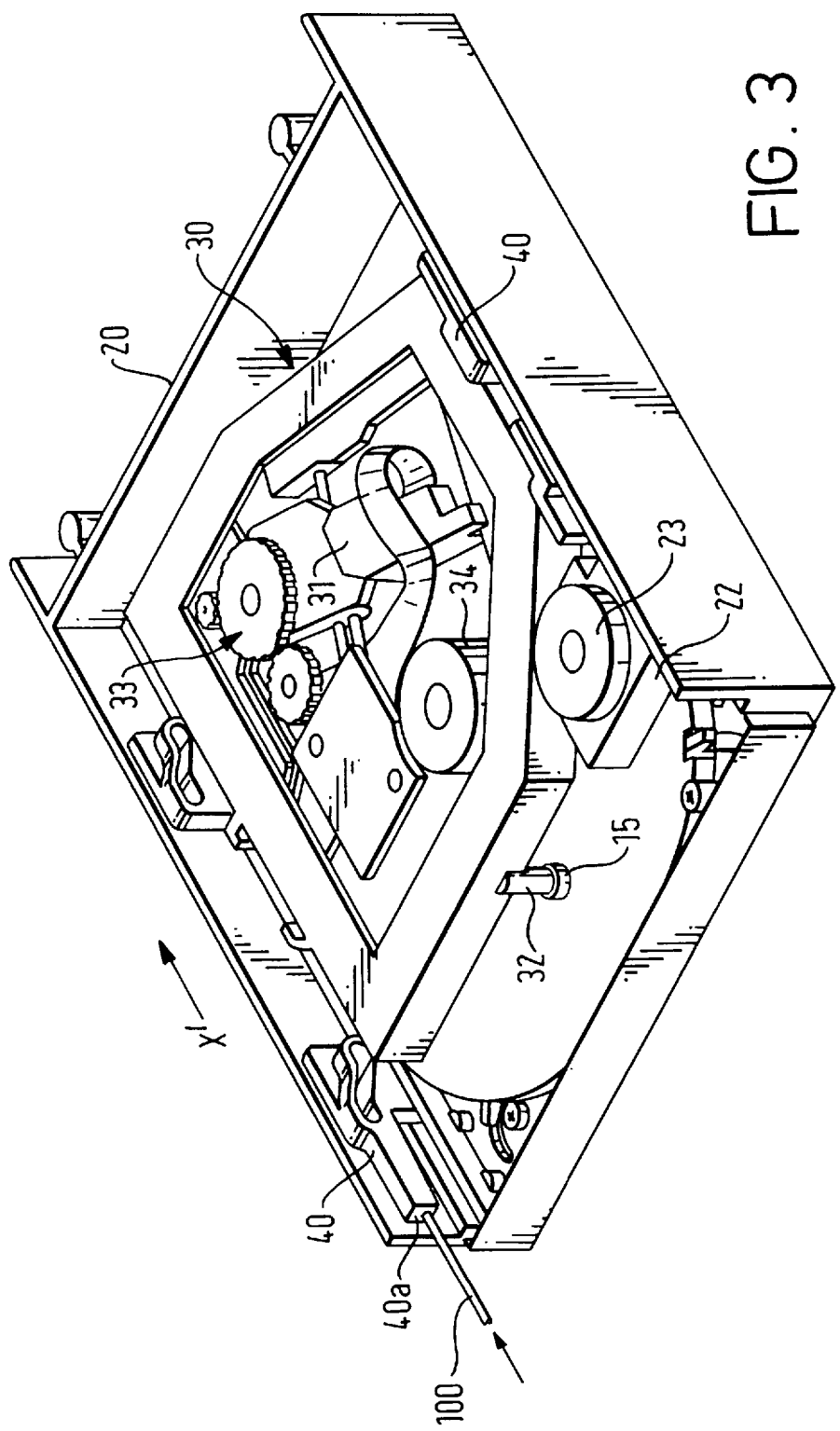
FIG. 3 is a perspective view for showing the backside arrangement of the optical disc player in FIG. 1.
Figure 4:
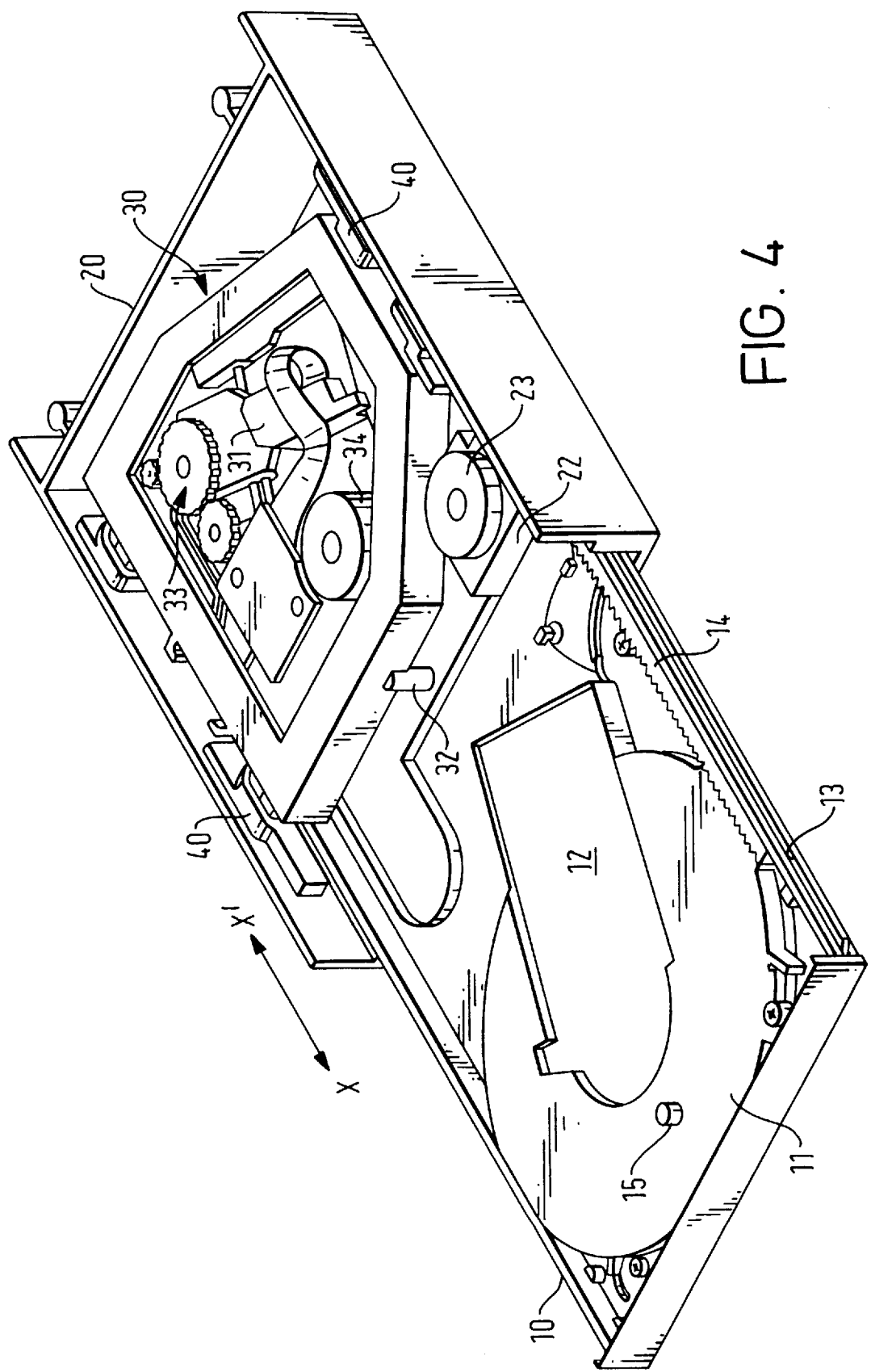
FIG. 4 is a perspective view for showing the state that the disc tray is ejected outside the optical disc player shown in FIG. 3.
Figure 5:
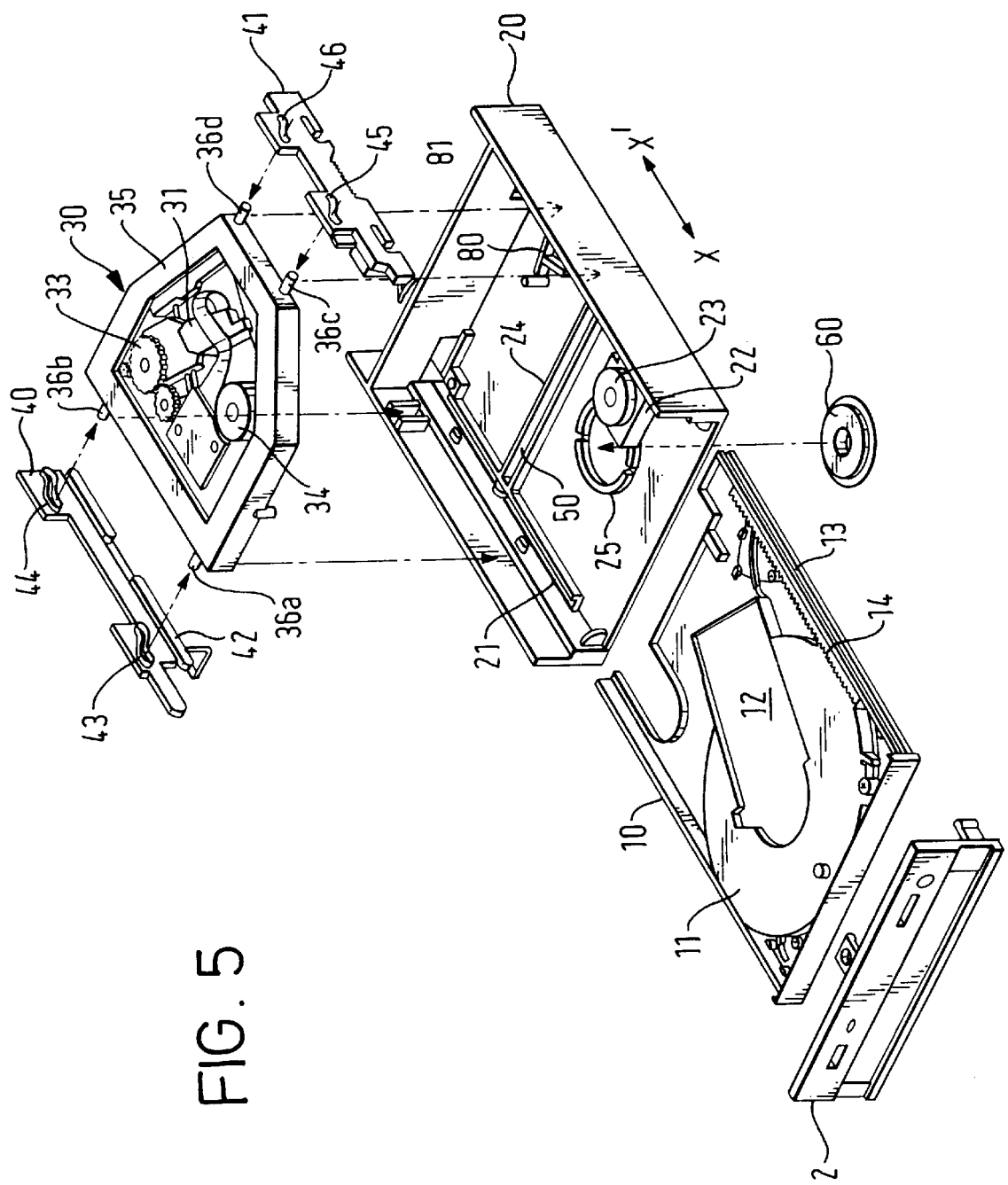
FIG. 5 is an exploded view of the optical disc player in FIG. 1.
Figure 6:
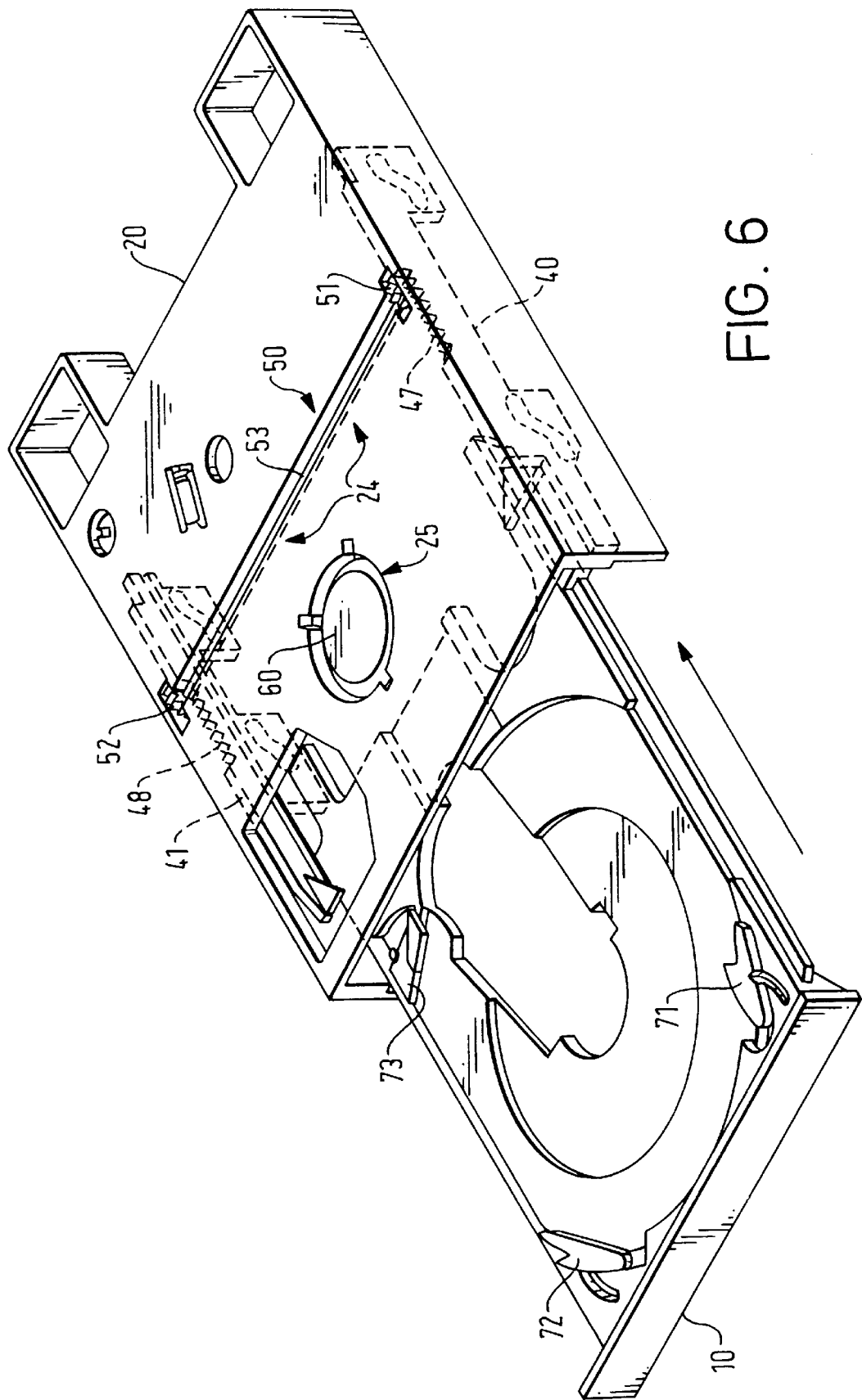
FIG. 6 is a perspective view for showing the internal structure of the optical disc player in FIG. 1 from the right side.

FIG. 3 is a perspective view showing an internal structure of the optical disc player without cabinet 1 from the underside. FIG. 4 is a perspective view showing the state that the disc tray 10 is ejected outside the optical disc reproducing apparatus, as shown in FIG. 3. FIG. 5 is an exploded view of FIG. 4. FIG. 6 is a perspective view showing the internal structure of the optical disc player from the upperside. Here, the cabinet 1 is omitted in the drawings.

In these drawings, 20 denotes a mold plastic frame. 30 denotes a pickup unit (hereinafter referred to as the PU unit}. 40, 41 denote a pair of sliders for supporting the disc tray 10 and the PU unit 30 and guiding their movement in the frame 20.

(Details of the frame 20)

On both inner sides of the frame 20, there are slider supports 21, 21 for supporting the sliders 40 and 41 slidable in the direction of an arrow X–X'. And on the frame 20 a motor 23 for loading or ejecting the disc tray 10 into or out of the cabinet 1 is provided. Further, on the frame 20 as shown in FIG. 6 a linking bar 24 for installing a link 50 which serves to synchronize the sliders 40 and 41 is mounted. Furthermore, in the frame 20 a disc damper base 25 for rotatably mounting a disc clamper 60 on the frame 20 is defined.

(Details of the disc tray 10)

On the disc tray 10 a disc receiving recess 11 for receiving the optical disc (not shown) and a window 12 for exposing a portion of the information carrying surface of the optical disc placed on the disc tray 10 in the moving range of the optical pickup 31 is provided. On both sides of the disc tray 10 slider engaging ribs 13 are formed along the longitudinal direction of the disc tray 10. The slider engaging ribs 13, 13 are fit into guide grooves 42 defined in each of the sliders 40 and 41 (see FIG. 10). Accordingly, the disc tray 10 is supported to move in the horizontal position in the direction of the arrow X–X' by the sliders 40 and 41. On one inside of the disc tray 10 a rack gear 14 is defined. The rack gear 14 is connected with the motor 23 through a series of gears. Further, in the disc receiving recess 11 of the disc tray 10 a pinhole 15 is formed. In the pinhole 15 a positioning pin 32 formed on the PU unit 30 is firmly inserted in the pinhole 15 so that the disc tray 10 and the PU unit 30 are positioned with each other in their pertinent locations.

Figure 7:
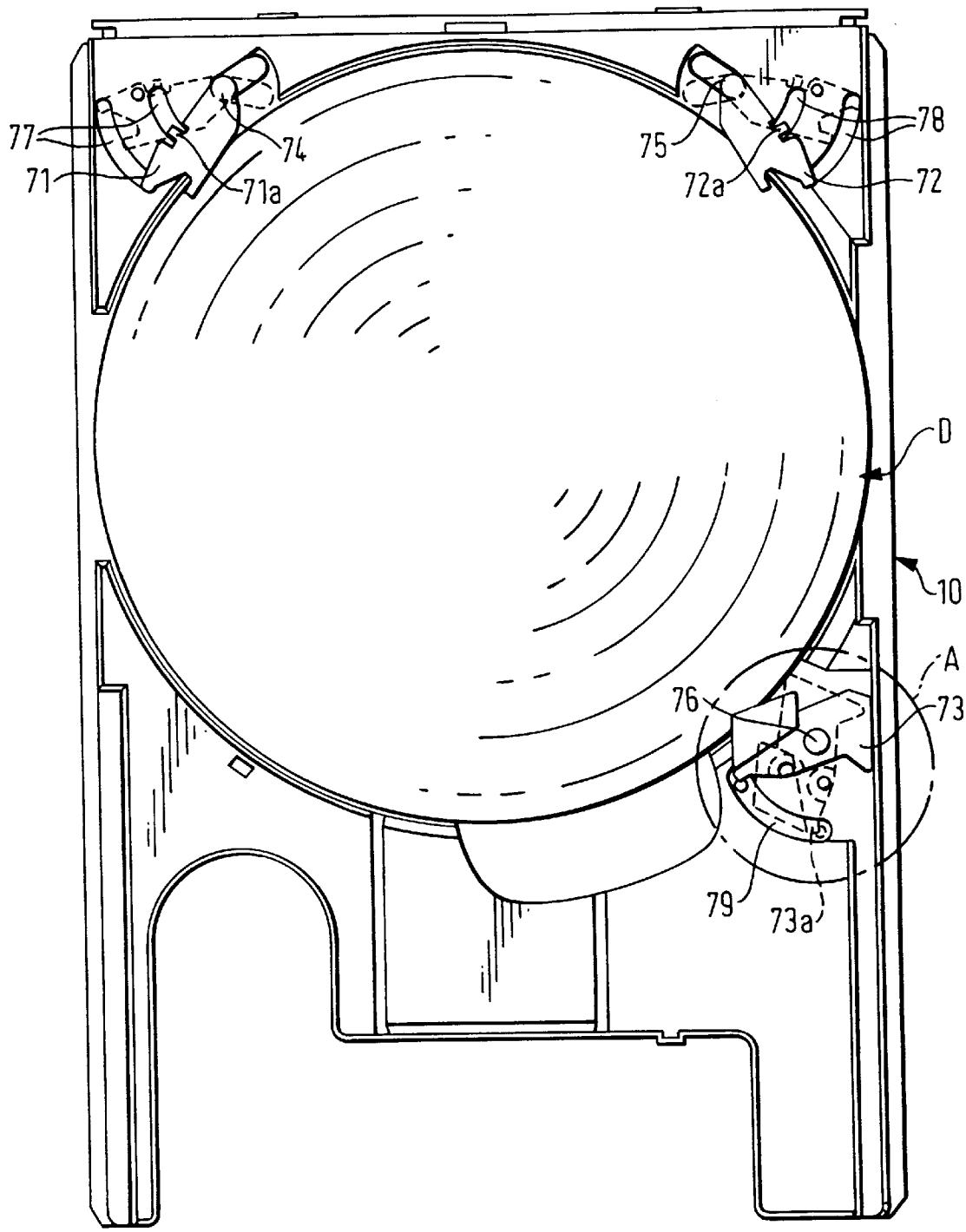
FIG. 7 is a plan view for showing the arrangement of the disc tray.

Further, as shown in FIG. 7 on each three corner portions of the disc tray 10 disc holders 71, 72 and 73 for holding the edge portion of the optical disc D placed on the disc receiving recess 11 with the disc tray 10 are mounted. Each of the disc holders 71, 72 and 73 is mounted on the disc tray 10 around axes 74, 75 and 76 in the state that they are rockable in parallel with the disc tray 10. Accordingly, the disc holders 71, 72 and 73 are rockable between the first position (shown by the solid line in the drawing) where they engage with the peripheral edge of the disc D to hold the disc D in cooperation with the disc tray 10 and the second position (shown by the dotted line in the drawing) where they are apart from the disc D thus releasing the holding of the disc D in cooperation with the disc tray 10. 77, 78 and 79 are guide grooves for defining respective rocking angles of the disc holders 71, 72 and 73. Protrusions 71a, 72a and 73a of the disc holders 71, 72 and 73 are inserted in the guide grooves 77, 78 and 79.

Figure 8:
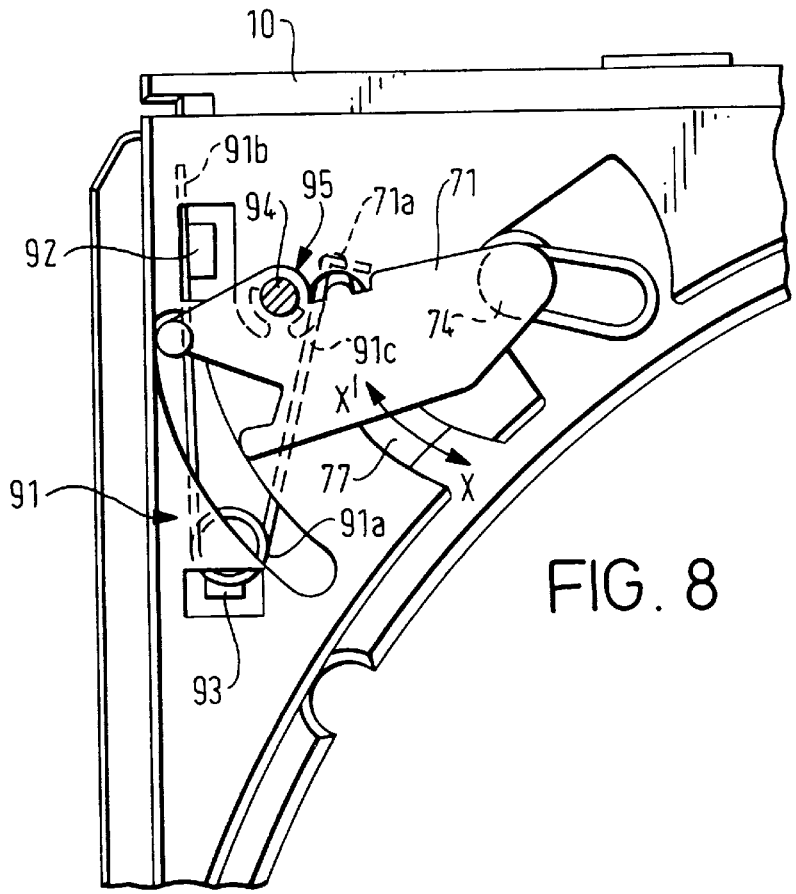
FIG. 8 is an enlarged plan view for showing the detail of the disc holder 71 mounted on the disc tray.
Figure 9:
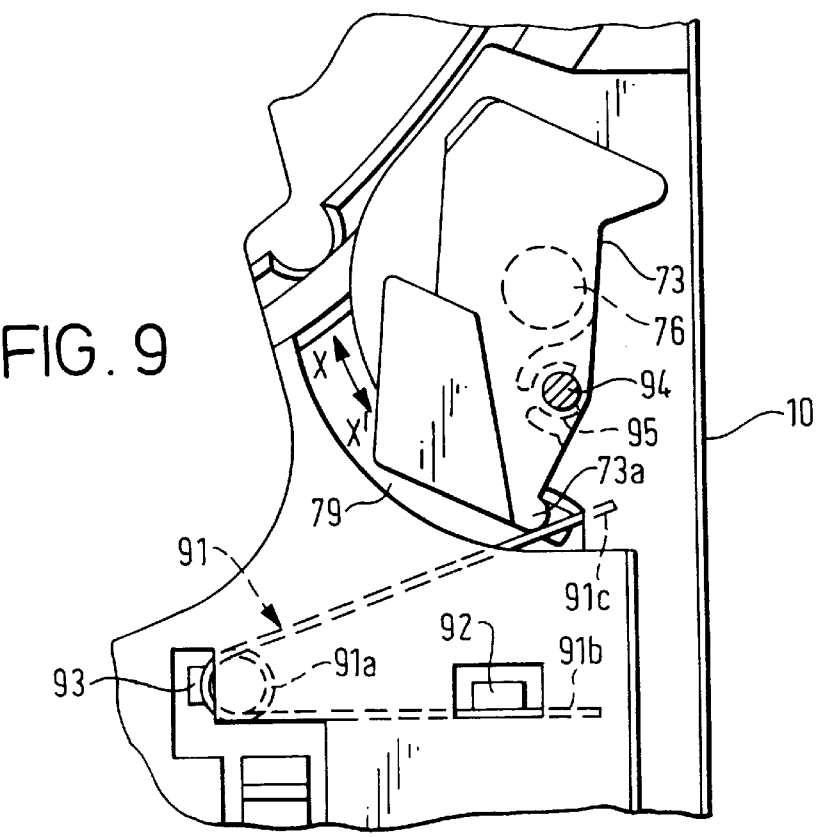
FIG. 9 is an enlarged plan view for showing the detail of the disc holder 73 mounted on the disc tray.

The detailed construction of the disc holders will be explained with reference to FIGS. 8 and 9. FIG. 8 is an enlarged view showing the disc holder 71, and FIG. 9 is an enlarged view showing the disc holder 73. The disc holder 72 has the mirror image shape with the disc holder 71.

In FIGS. 8 and 9, 91 denotes a spring member. The spring member 91 is comprised of a coiled portion 91a and two spring arms 91b and 91c extending from the coiled portion 91a. The coiled portion 91a and one spring arm 91b are engaged with hooks 93 and 92 defined on the disc tray 10, while the other spring arm 91c is engaged with the protrusion 71a (73a) of the disc holder 71 (73). The spring member 91 is biased to straddle the spring arms 91b and 91c. Thus the disc holder 71 (73) is so biased by the spring member 91 to rock in the direction of the arrow X, in other words, to the first position to engage with the peripheral edge of the disc D.

Further, on each of the disc holders 71, 72 and 73 a receptacle 95, for fastening the disc holder in the second position (the releasing and fastening position of the disc holding) by being fastened with the disc holder fastening pin 94 formed on the disc tray 10, protrudes. By manually rocking the disc holder to the direction of the arrow X and pressing the straddling portion against the disc holder fastening pin 94, the straddling portions of the receptacle 95 can be resiliently deformed to straddle for catching the disc holder fastening pin 94 therein. Thus, the receptacle 25 is combined with the disc holder fastening pin 94. These engagements can be released by simply manually rocking the disc holders 71, 72 and 73 in the direction of the arrow X'.

(Details of the PU unit 30)

As shown in FIGS. 3 through 5, the PU unit 30 is comprised of an optical pickup 31 for reading information from the optical information carrying surface of the optical disc, a pickup feed mechanism 33 for feeding the optical pickup 31 in the radius direction of the optical disc, a disc drive system having a turntable rotatably holding the optical disc in cooperation with the disc damper 60 and a disc motor 34, a frame 35 for integrally supporting the above described structures, and a circuit board. Here, the positioning pin 22 as mentioned above is integrally mounted on the frame 35. Further, from both sides of the frame 35 guide pins 36a, 36b, 36c and 36d project and are inserted through guide slits 43, 44, 45 and 46 defined in the sliders 40 and 41.

(Details of the sliders 40 and 41)

Figure 10:
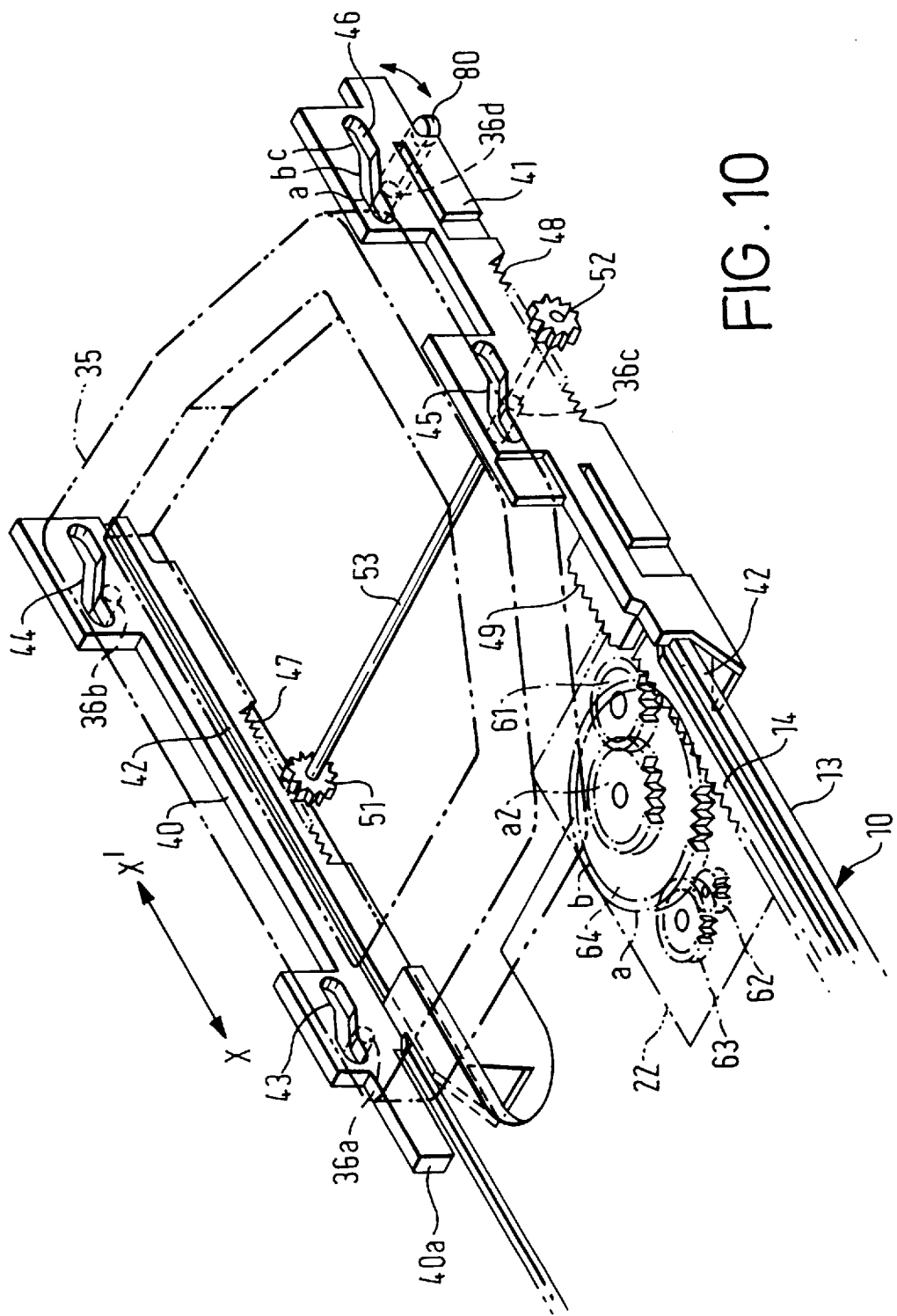
FIG. 10 is a perspective view for showing the mutual relations among the sliders, the disc tray and the PU unit.

FIG. 10 is a perspective view showing the mutual relations among the sliders 40 and 41, the disc tray 10 and the PU unit 30. As shown in the drawing, on the sliders 40 and 41 longitudinally elongated guide grooves 42 are provided for guiding the disc tray 10 in the direction of the arrows X–X' in cooperation with the slider engaging ribs 13, 13 formed on both sides of the disc tray 10 fitting into the grooves 42. Further, on each of the sliders 40 and 41 two guide slits 43, 44 (45, 46) are defined. Then the guide pins 36*a*, 36*b* and 36*c*, 36*d* projecting from the side of the frame 35 of the PU unit 30 are inserted into the guide slits 43, 44, 45 and 46. Each of the guide slits 43, 44, 45 and 46 has guide channels a, b and c. For example, the guide channels 43*a* and 43*c* of the guide slit 43 elongate in the horizontal direction. While the guide channel 43*b* of the guide slit 43 elongates in the inclined direction to link the horizontal guide channels 43*a* and 43*c* together. That is, the guide channels, e.g., 43*a* through 43*c* are so constructed to guide the PU unit 30 up-and-down within the prescribed height range according to the sliding movements of the sliders 40 and 41 in the direction of the arrow X–X'.

Further, rack gears 47 and 48 are defined on the bottom ends of the sliders 40 and 41. The rack gears 47 and 48 are respectively engaged with gears 51 and 52 fixed on both ends of a shaft 53 of the link 50, as shown in FIG. 6. Thus, the link 50 is comprised of the shaft 53 and the gears 51, 52 fixed on both ends of the shaft 53, and rotatably mounted in the prescribed position of the frame 20. As a result, the sliders 40 and 41 move together in synchronized relation via the link 50. Further, on one slider 41 another rack gear 49 is engaged with a gear 61 which is coupled to the motor 23 through a series of gears.

Figure 11:
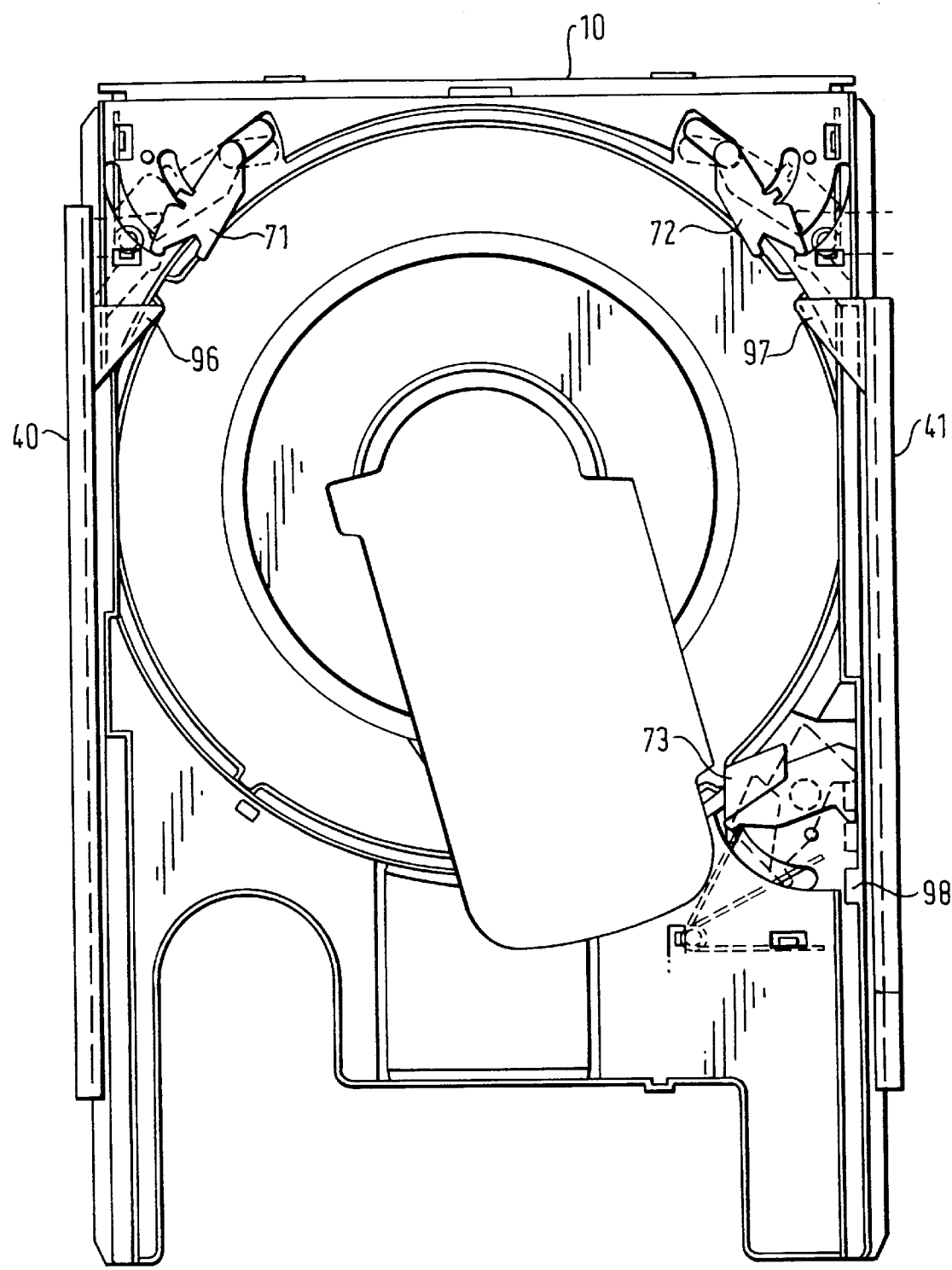
FIG. 11 is a plan view for showing the relation between the disc holder and the disc holder releasing protrusion.
Figure 12A:
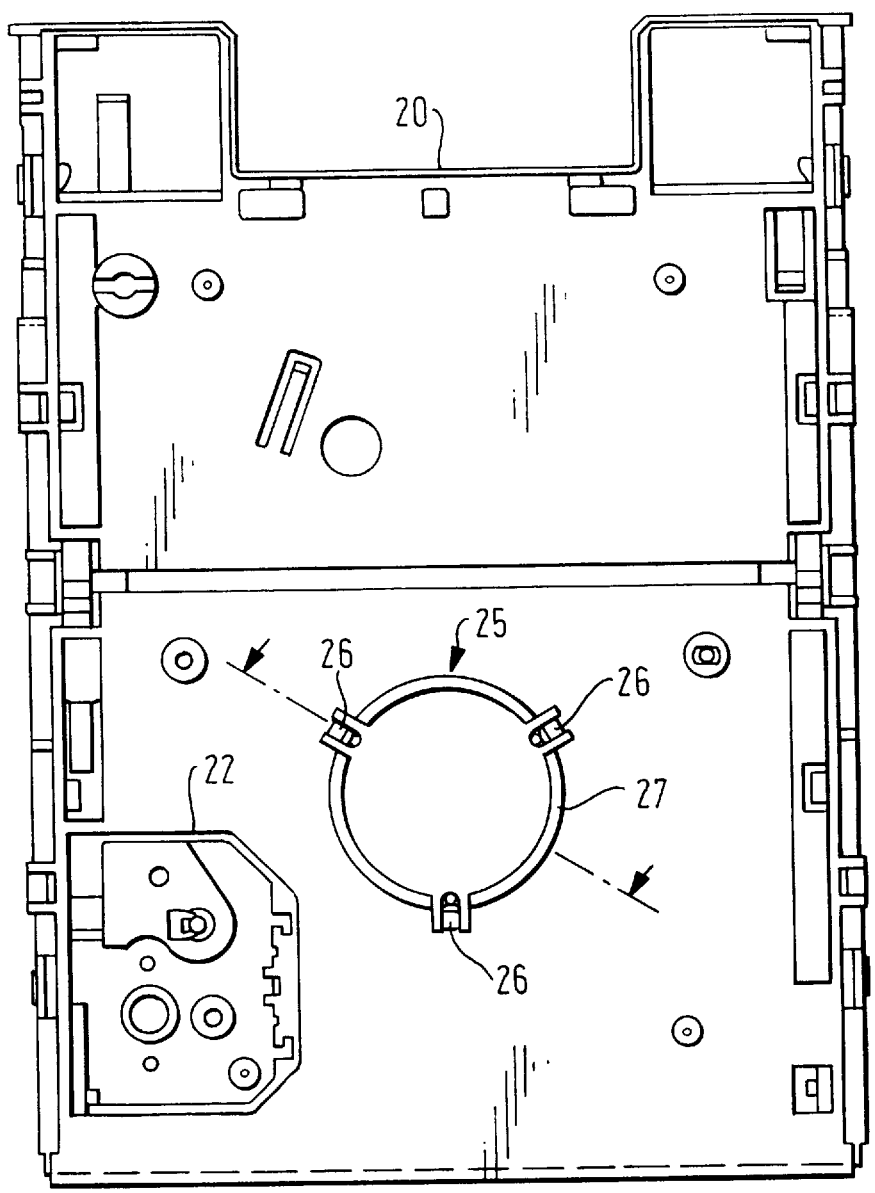
FIGS. 12A and 12B are a plan view, respectively, and a side section view for showing the disc hold mechanism.
Figure 12B:
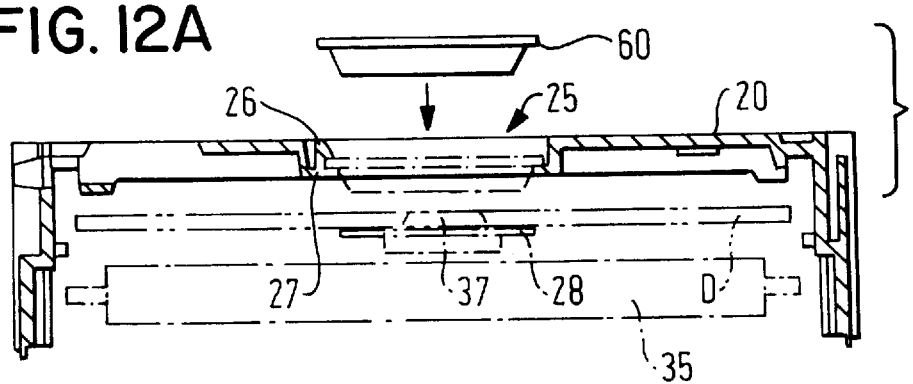

Further, as shown in FIG. 11, on each of the sliders 40 and 41 three protrusions 96, 97 and 98 capable of bumping against the disc holders 71, 72 and 73 to rock them toward their second positions where the disc holding is released against the bias of the spring member 91. Here, the slider 41 has two protrusions 97 and 98. The protrusions 97, 98 are staggered in height from each other, i.e., in the direction perpendicular to the surface of the disc D so that the protrusion 97 may bump against its only one associated disc holder 72, while the other protrusion 98 may bump against its only one associated disc holder 73.

(Details of the disc hold mechanism)

In FIGS. 5, 6 and 12A–12B, 25 denotes a disc clamper mounting base for rotatably mounting the disc clamper 60. The disc clamper mounting base 25 has three hooks 26, 26, 26 for positioning the disc clamper 60 fitted in the disc clamper mounting base 25. Thus the disc clamper 60 is rotatably held between the three hooks 26, 26, 26 and a pedestal 27 defined in lower part of the round opening. Here, the hooks 26, 26, 26 can be resiliently deformed by being depressed by the disc clamper 60 when the disc clamper 60 is mounted into the disc clamper mounting base 25. In more detail, each hook 26 has a tapered end which is resiliently deformable by the depression from the disc clamper 60 at the mounting of the disc clamper 60, and a horizontal surface for checking the escape of the disc clamper 60 from the disc clamper mounting base 25 after the disc clamper 60 has been mounted therein. Here, the disc clamper 60 has a magnet (not shown) for holding the optical disc D between the turntable 28 and the disc clamper 60 by attracting with a magnetic substance (not shown) provided on turntable 28.

Referring now to FIGS. 13 through 21, the operation of the optical disc player will be explained.

(Details of the disc tray loading operation)

Figure 13:
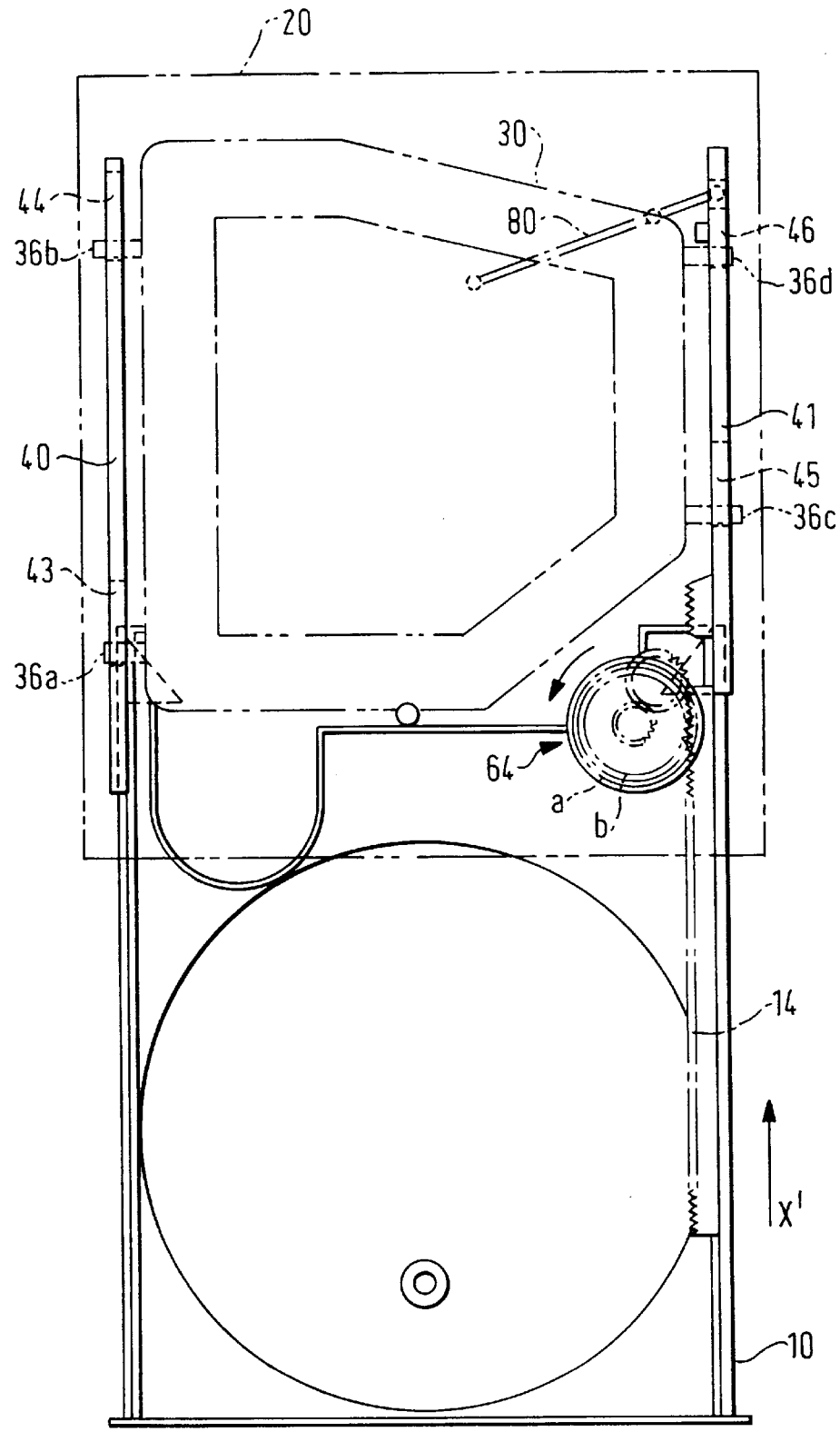
FIG. 13 is a plan view for showing the state that the disc tray is ejected from the optical disc player.

FIG. 13 is a plan view showing the state that the disc tray 10 is ejected outside the main body. The disc tray loading operation is initiated by the user pushing the disc tray 10 in the direction of the arrow X by his/her finger and the like. If the disc tray 10 is forced by a certain distance the motor 23 is turned ON. Then after that the motor 23 drives the entire of clutch gear 64 to rotate in the direction of the arrow, so that the disc tray 10 is loaded into the main body of the apparatus.

Figure 14:
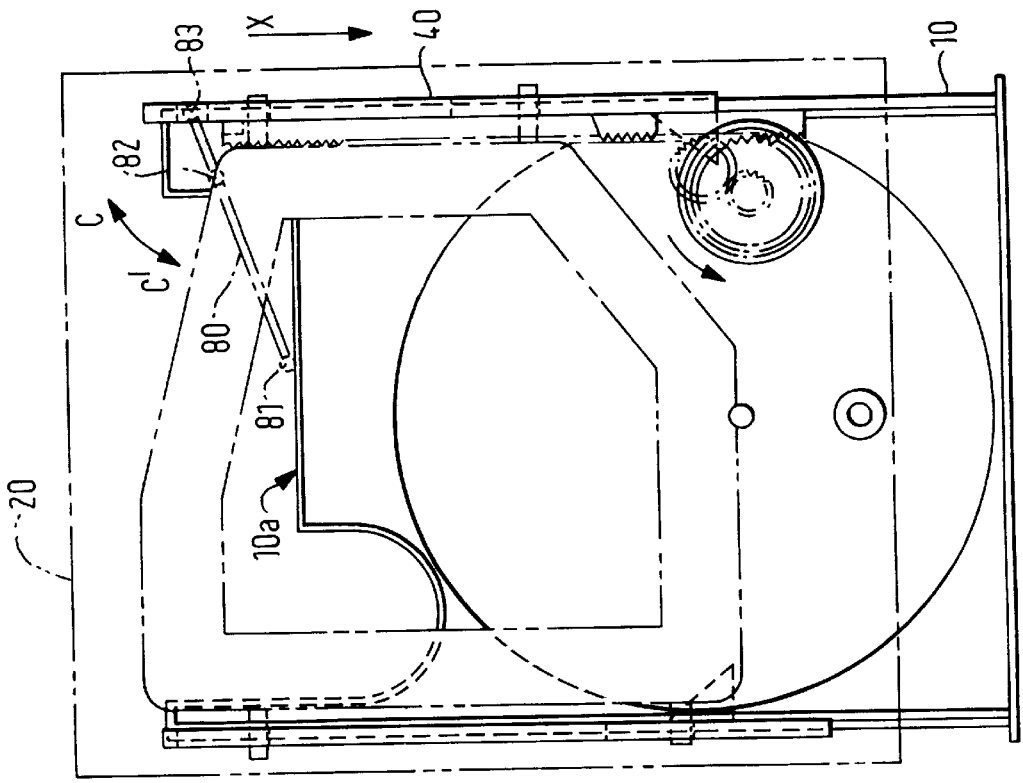
FIG. 14 is a plan view for showing the state that the disc tray is loaded into the disc player.

When the disc tray 10 is loaded into the main body by a prescribed distance, the rear end 10*a* of the disc tray 10 bumps against one end 81 of a rocking lever 80, as shown in FIG. 14. The rocking lever 80 is rockably suspended to the frame 20 via an axis 82. The other end 83 of the rocking lever is able to bump against the rear end of the slider 40 pushing the slider 40 frontward (the direction of the arrow X). Accordingly, the rocking lever 80 is rocked in the direction of the arrow C by the end 81 of the rocking lever 80 bumping against the rear end 10*a* of the disc tray 10. Then, the slider 40 commences to slide frontward (the direction of the arrow X). According to the frontward (the direction of the arrow X) sliding of the slider 40, the other slider 41 linked with the slider 40 through the link 50 also slides frontward (the direction of the arrow X) in synchronism with the slider 40.

Figure 15:
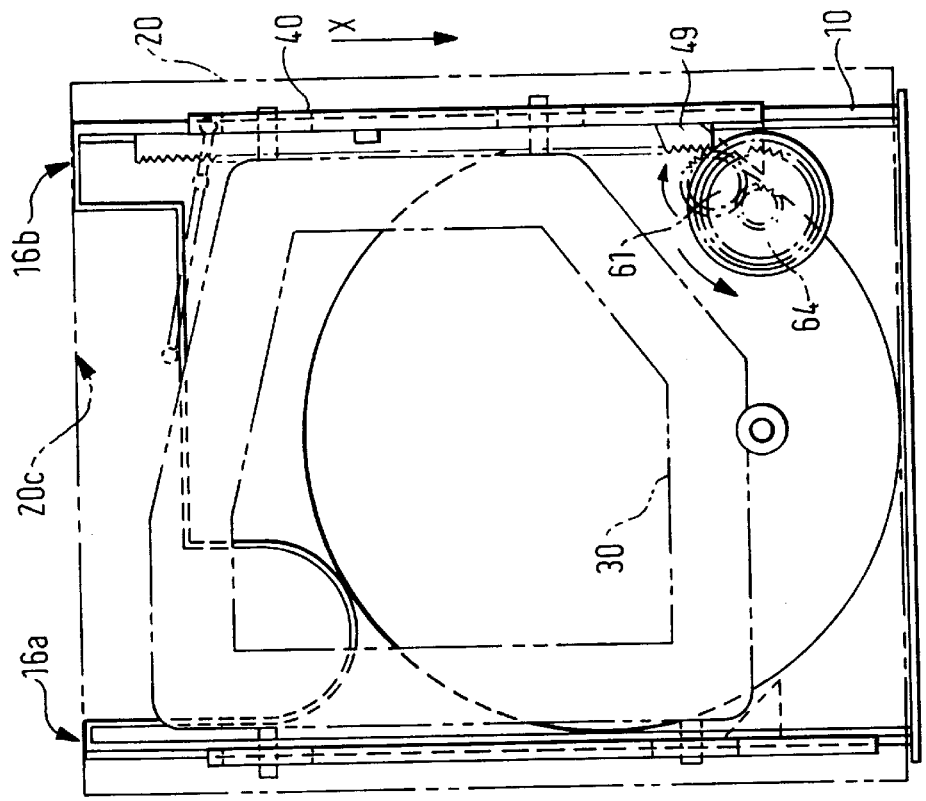
FIG. 15 is a plan view for showing the state that the loading operation of the disc has just completed.
Figure 16A:
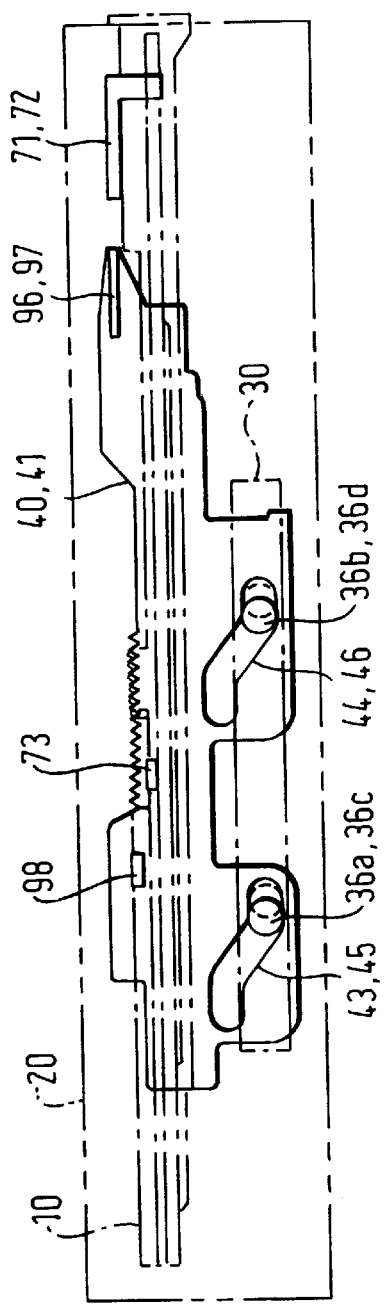
FIGS. 16A through 16C are side views for showing the operation at the disc tray loading time.
Figure 16B:
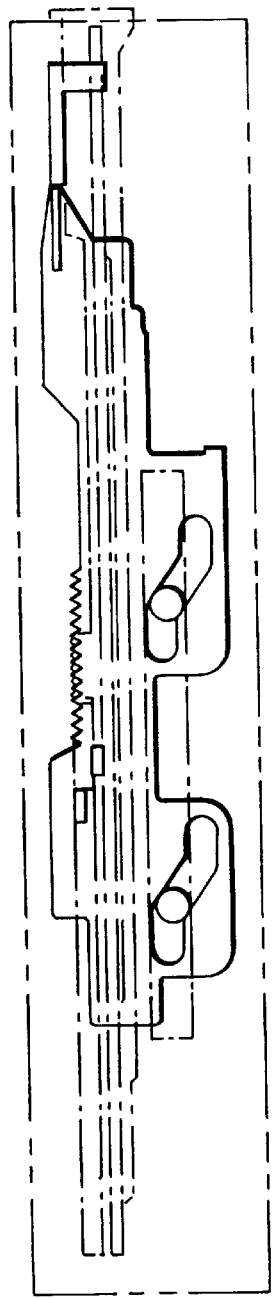
Figure 16C:
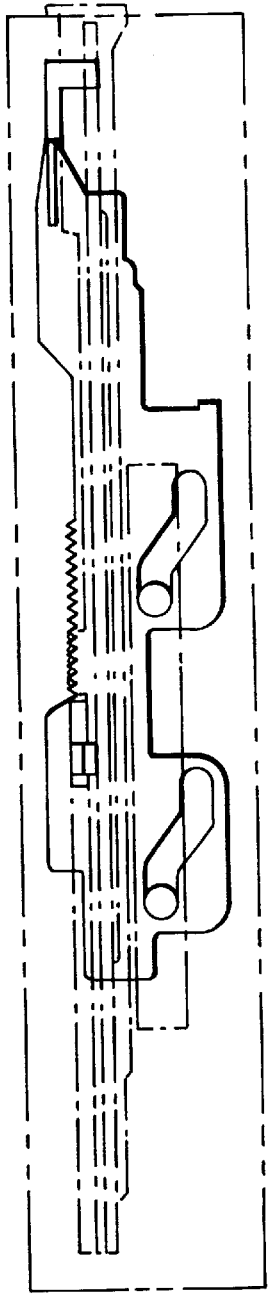

Then, as shown in FIG. 15, when the rear ends 16*a* and 16*b* bump against the deepest end 20*c* of the frame 20 the loading operation of the disc tray 10 is completed. FIG. 16A is a side view showing the positional relationships among the guide pins 36*a*, 36*b*, 36*c* and 36*d* of the PU unit 30 and the guide slits 43, 44, 45 and 46 of the sliders 40 and 41 at that time. Here, the dotted lines in the drawing illustrate respective positions of the guide pins 36*a*, 36*b*, 36*c* and 36*d* at the time that the disc tray 10 is ejected outside the main body of the apparatus.

Figure 17B:
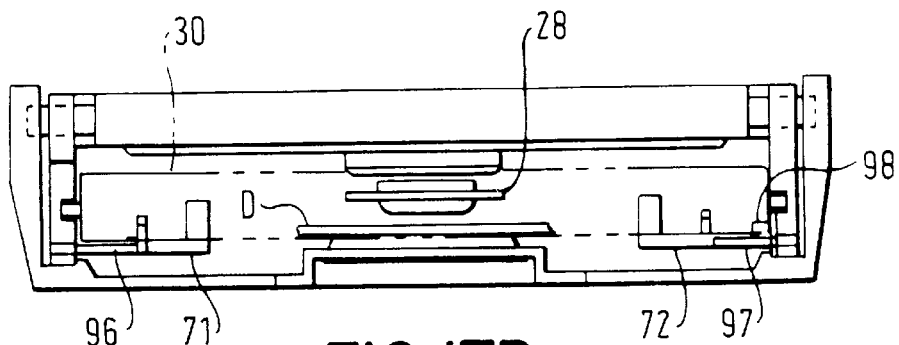
FIGS. 17A–17C are plan, front and side views, respectively, for showing the states of the disc holders at the time in FIG. 16A.
Figure 17A:
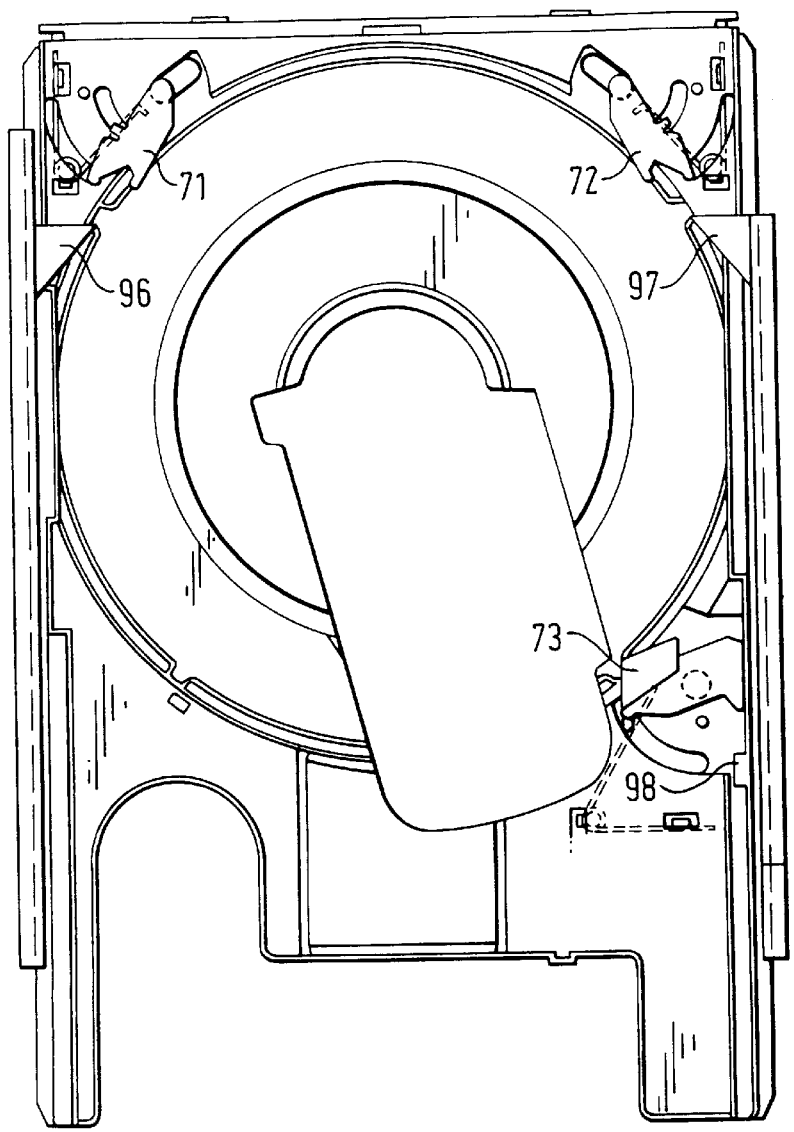
Figure 17C:
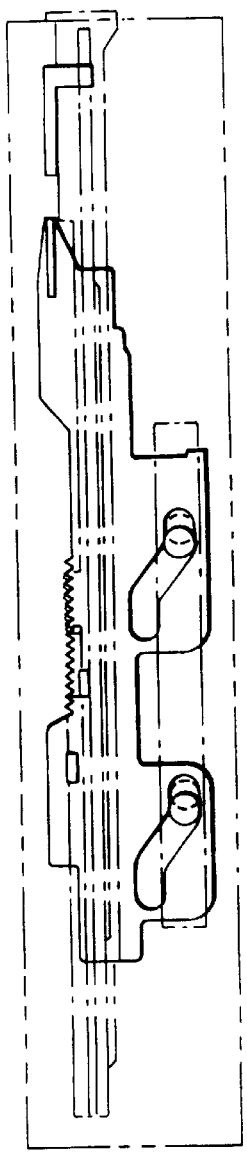
Figure 18B:
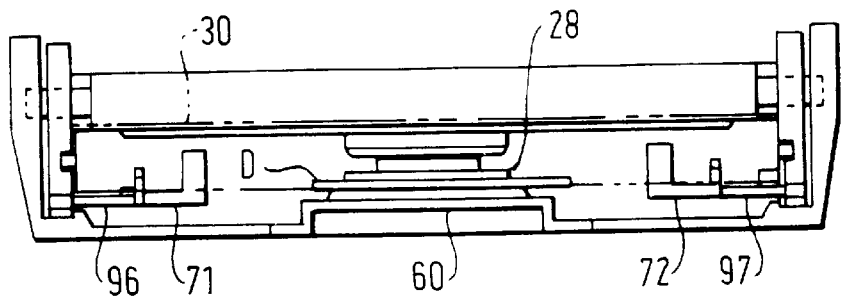
FIGS. 18A–18C are of plan, front and side views, respectively, for showing the states of the disc holders at the time in FIG. 16B.
Figure 18A:
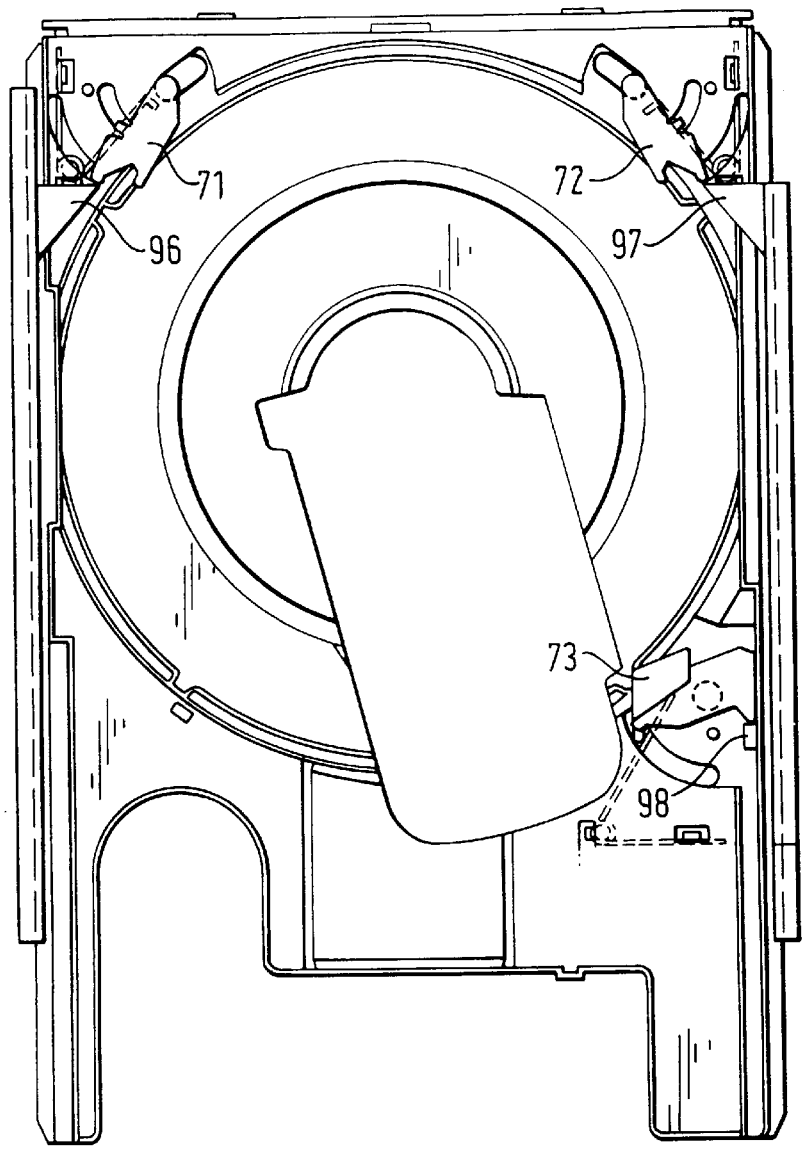
Figure 18C:
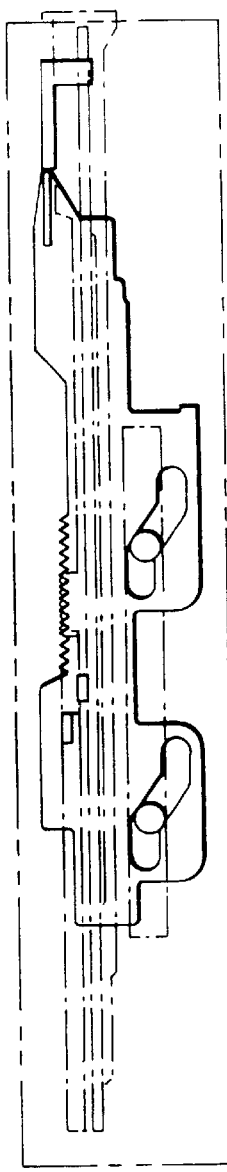
Figure 19B:
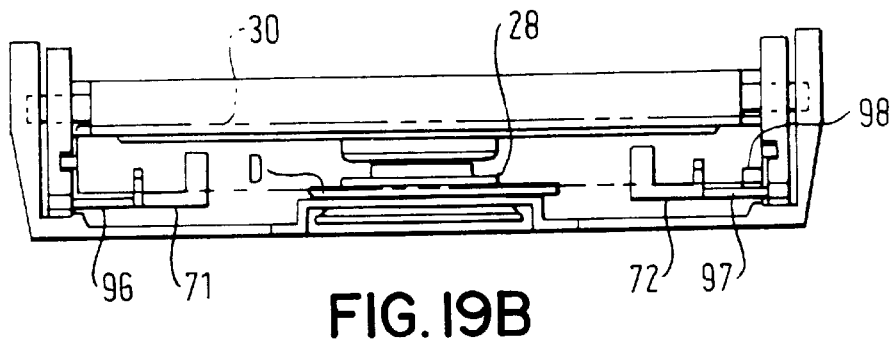
FIGS. 19A–19C are plan, front and side views, respectively, for showing the states of the disc holders at the time in FIG. 16C.
Figure 19A:
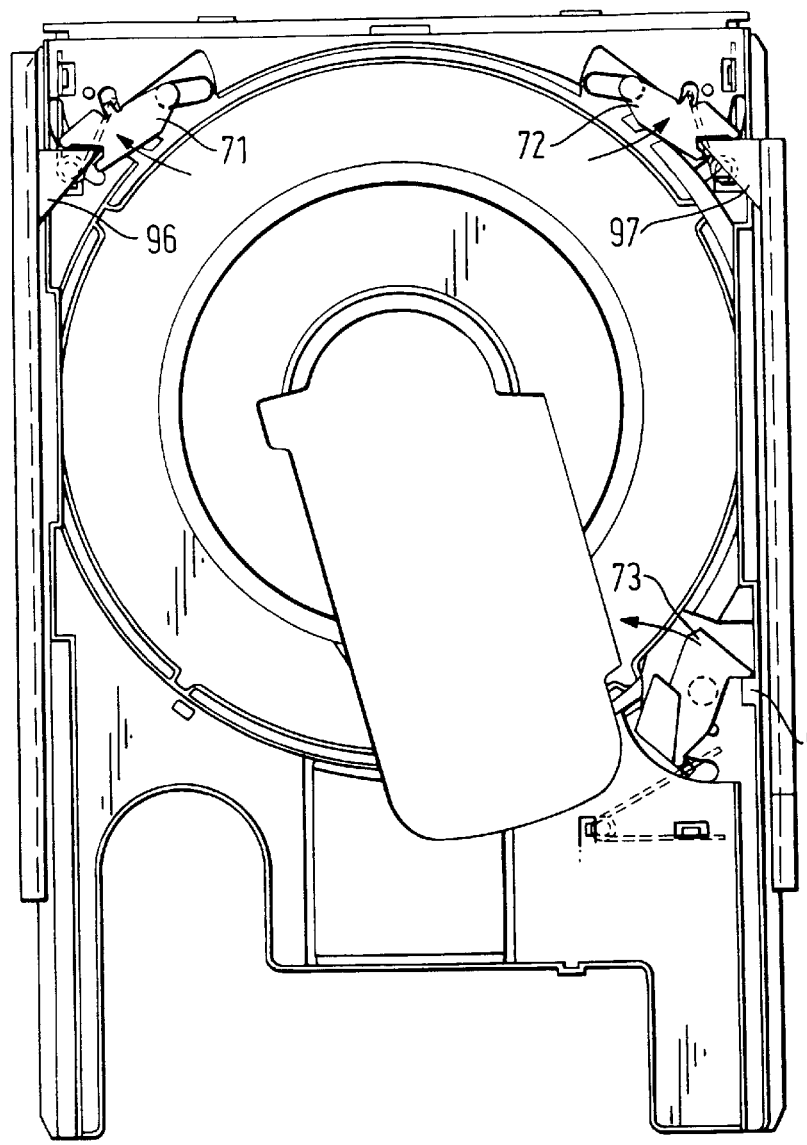
Figure 19C:
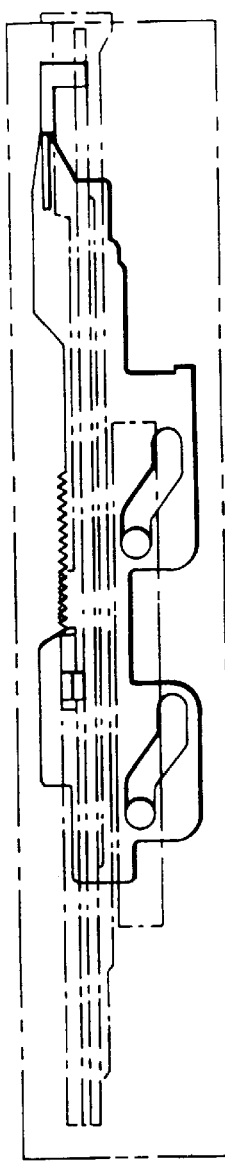

FIG. 17A–17C include plan, front and side views for showing the states of the disc holders 71, 72 and 73 at this time. As shown in the drawing, either of the disc holders 71, 72 and 73 does not bump against the protrusions 96, 97 and 98 on the sliders 40 and 41 in this time. And further, since the PU unit 30 does not yet move up-and-down, the PU unit 30 is placed in the state where it does not bump against any of the disc D and turntable 28.

On the other hand, as show in FIG. 15, the slider 40 is placed in the position where the rack gear 49 can engage with the gear 61 at that time. Accordingly, the sliders 40 and 41 are driven furthermore in the direction of the arrow X by the motor 23. According to the movement of the sliders 40 and 41 the PU unit 30 commences to move toward the disc clamper 60.

FIGS. 18A–18C and 16B show the states immediately after the protrusions 96, 97 and 98 on the sliders 40 and 41 have bumped against their associated one of the disc holders 71, 72 and 73 by the movements of the sliders 40 and 41 and PU unit 30. At this time, the turntable 28 has already bumped against the disc D and been in the process of pressing the disc D toward the disc clamper 60.

FIGS. 19A–19C and 16C show the states of the disc holders 71, 72 and 73 at the time that the disc tray loading has just finished. At that time, the disc holders 71, 72 and 73 are rocked toward around the second position by their corresponding protrusions 96, 97 and 98. Here, as mentioned above, the second position represents the position where the disc holding state according to the disc holders 71, 72 and 73 has been released. In order to temporarily release the disc holding it is not necessary to fully rock the disc holders 71, 72 and 73 to their second positions, but enough to rock them toward around the second position. So, the disc D on the disc tray 10 is disengaged from the disc holders 71, 72 and 73, and detached from the disc tray 10 by being pressed by the turntable 28. Thus the disc D is held between the turntable 28 and the disc clamper 60.

The disc tray 10 is ejected outside the main body of the apparatus by operating the eject button 4 on the front panel 2. When an eject detecting signal is input the controller controls the motor 23 to drive in opposite direction to the loading time. According to this PU unit 30 moves from the position C (altitude position) to the position A (altitude position) in FIG. 16, and thus the disc holding is released. After this operation, the disc tray is ejected in the entirely reverse process to the loading process.

(Method of using the disc tray in the horizontal position)

Figure 20:
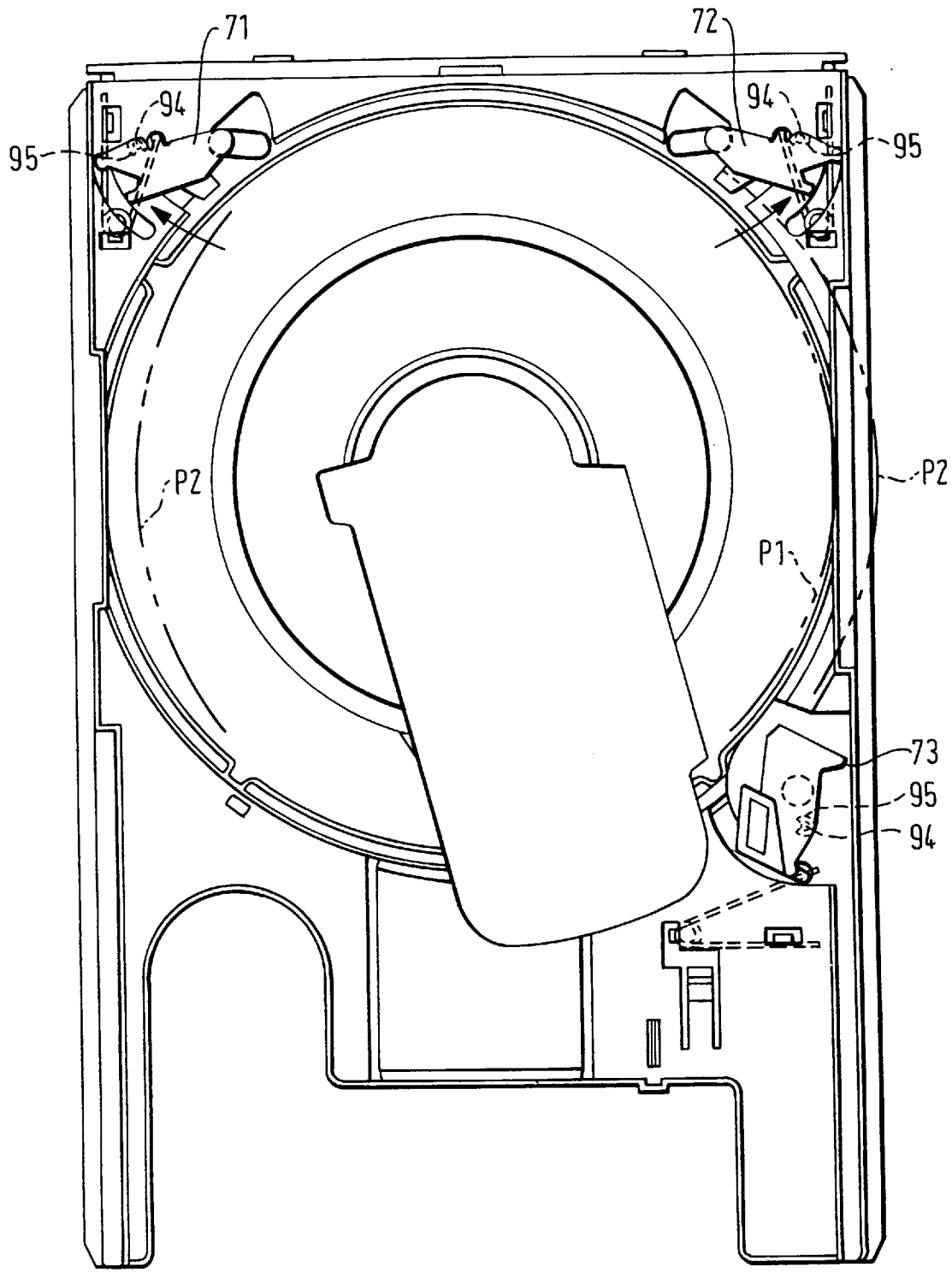
FIG. 20 is a plan view for showing the state that the disc holders are fastened at positions prevented from engagement with a disc placed on the disc tray.

As well as that the disc tray apparatus can be stably used in the vertical position, as explained above, the disc tray according to the present invention can be used in the horizontal position. In other words, the optical disc D can be simply placed on the disc tray 10. In this case, the disc holders 71, 72 and 73 on the disc tray 10 are left unused. So, when the apparatus is used in the horizontal position, as shown in FIGS. 20, 8 and 9, the straddling portion of the receptacle 95 is pressed against the disc holder fastening pin 94 by manually rocking the disc holders 71, 72 and 73 in the direction of the arrow X. Then the disc holder fastening pin 94 is compelled to be fit into the straddling portion. Accordingly, the disc holders 71, 72 and 73 are fastened in the remote positions from the disc placed on the disc tray not to engage with the disc.

(Operation for placing and detaching disc on and from the disc tray)

Figure 21A:
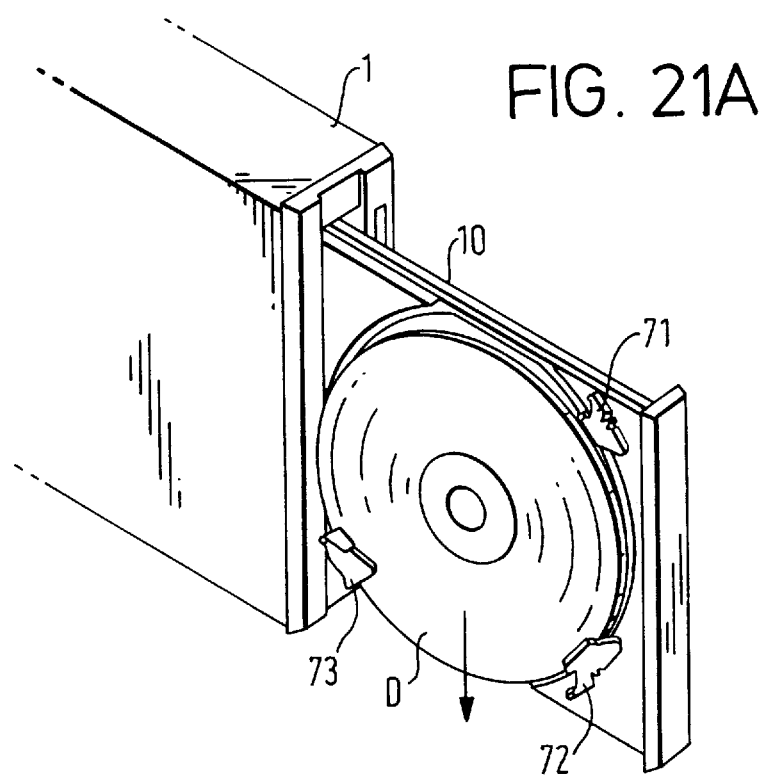
FIG. 21 is a perspective views for showing the process for manually placing the disc on the disc tray.
Figure 21B:
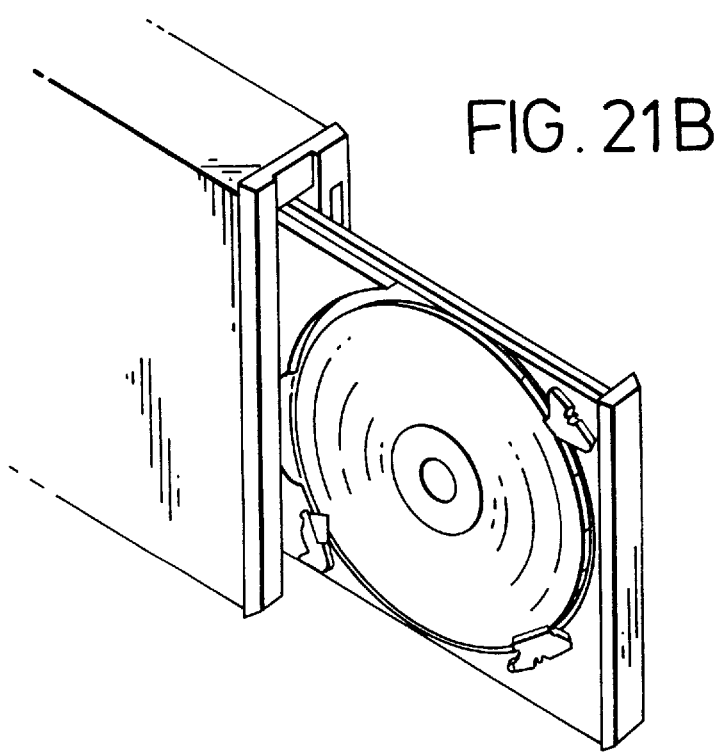

FIG. 21 shows the state that the disc D is placed on the disc tray 10. As shown in the drawing, when the disc D is placed on the disc tray 10 the disc is leaned forward a little and the lower edge portion of the disc D is inserted between the lowerside disc holders 72, 73 and the disc tray 10. Then by slightly pressing the disc D downward, the disc D is moved to one edge of the disc receiving portion (recess) 11 on the disc tray 10 against the elasticity of the spring member 91 (FIG. 8). That is, on the edge of the disc receiving portion (recess) 11 on the disc tray 10 as shown in FIG. 20, a margin for shifting the disc D to one prescribed position P2 shifted by a little distance from another prescribed position P1 is provided. When the disc D is placed on the disc tray 10, by shifting the disc D to the position P2 the disc D can fit in the disc receiving portion (recess) 11 without engaging with the upper disc holder 71. After that, when the user releases the disc D from his/her finger the disc D is lifted up by the elasticity of the spring member 91 engaged with the lower disc holders 72 and 73. Then the upper part of the disc D is inserted between the disc holder 71 and the disc tray 10. As a result, the disc D is moved to the prescribed position P1 (see FIG. 20) within the disc receiving portion (recess) 11 and stably placed therein.

Accordingly, in the optical disc player in the above embodiments, it is possible to easily place the disc D on the disc tray 10 by e.g., one-handed manipulation. It is also possible to easily take the disc out from the disc tray 10 by also one-handed manipulation.

According to the disc tray and the disc player employing such a disc tray of the present invention as described above, when the disc tray is ejected outside the disc player, the disc placed on the disc tray is held between the disc tray and the disc holding member. Then the disc holding member is moved to the position where the disc holding is released when the disc tray is loaded to the prescribed reproducing position in the disc player, or when the disc is detached from the disc tray placed in the disc player by the disc driving mechanism. Even if the apparatus is used in a vertical position, in other words, the disc is placed in an almost vertical position on the disc tray it is possible to stabilize the disc in the appropriate position of the disc tray, load the disc tray to the prescribed reproducing position within the disc player and detach the disc from the disc tray to reproduce the disc at the reproducing position.

As described above, the present invention can provide an extremely preferable disc tray and disc player employing such a disc tray.

While there have been illustrated and described what are at present considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

The foregoing description and the drawings are regarded by the applicant as including a variety of individually inventive concepts, some of which may lie partially or wholly outside the scope of some or all of the following claims. The fact that the applicant has chosen at the time of filing of the present application to restrict the claimed scope of protection in accordance with the following claims is not to be taken as a disclaimer of alternative inventive concepts that are included in the contents of the application and could be defined by claims differing in scope from the following claims, which different claims may be adopted subsequently during prosecution, for example, for the purposes of a divisional application.

What is claimed is:

1. A disc player capable of loading and ejecting a disc tray into and out of the disc player when said disc player is vertically oriented, and also capable of loading and ejecting the disc tray into and out of the disc player when said disc player is horizontally oriented, said disc player comprising:
   a disc holding member movable in parallel to a surface of the disc tray between a first position in which the disc holding member does not hold a disc to the disc tray when the disc faces the disc tray and a second position in which the disc holding member holds a disc to the disc tray when the disc faces the disc tray at least when the disc tray is placed outside of the disc player; and
   disc hold releasing means for disengaging the disc holding member from the disc placed on the disc tray when the disc tray moves toward a prescribed reproducing position in the disc player, wherein:
   the disc holding member includes members selectively mounted on three or more corners of the disc tray having a rectangular shape; and
   two of the holding members are aligned with each other alone a loading direction of the disc tray and the disc hold releasing means which bums against their associated disc holding member are staggered in their positions in a direction perpendicular to the surface of the disc placed on the disc tray.

2. A disc player capable of loading and ejecting a disc tray into and out of the disc player when said disc player is vertically oriented, and also capable of loading and ejecting the disc tray into and out of the disc player when said disc player is horizontally oriented, said disc player comprising:
   a disc driving mechanism mounted in the disc player for detaching the disc from the disc tray loaded in the disc player in a direction perpendicular to the disc face, and for driving the disc by holding the disc;

a disc holding member movably mounted on the disc tray along a surface which is parallel to a surface of the disc placed on the disc tray, said disc holding member being movable between a first position in which the disc holding member does not hold a disc to the disc tray when the disc faces the disc tray and a second position in which the disc holding member holds a disc to the disc tray when the disc faces the disc tray at least when the disc tray is placed outside of the disc player; and disc hold releasing means for disengaging the disc holding member from the disc placed on the disc tray when the disc is detached from the disc tray loaded in the disc player by the disc driving mechanism, wherein:

the disc holding member includes members selectively mounted on three or more corners of the disc tray having a rectangular shape; and two of the holding members are aligned with each other along a loading direction of the disc tray and the disc hold releasing means which bump against their associated disc holding member are staggered in their positions in a direction perpendicular to the surface of the disc placed on the disc tray.

3. A disc player capable of loading and ejecting a disc tray into and out of the disc player when said disc player is vertically oriented, and also capable of loading and ejecting the disc tray into and out of the disc player when said disc player is horizontally oriented, said disc player comprising:

a disc holding member movable in parallel to a surface of the disc tray between a first position in which the disc holding member does not hold a disc to the disc tray when the disc is on the disc tray and a second position in which the disc holding member holds a disc to the disc tray when the disc is on the disc tray at least when the disc tray is placed outside of the disc player; and disc hold releasing means for disengaging the disc holding member from the disc placed on the disc tray by bumping against the disc holding member when the disc tray moves toward a prescribed disc reproducing position in the disc player, wherein:

the disc holding member includes members selectively mounted on three or more corners of the disc tray having a rectangular shape; and two of the holding members are aligned with each other along a loading direction of the disc tray and the disc hold releasing means which bump against their associated disc holding member are staggered in their positions in a direction perpendicular to the surface of the disc placed on the disc tray.

4. A disc player capable of loading and ejecting a disc tray into and out of the disc player when said disc player is vertically oriented, and also capable of loading and ejecting the disc tray into and out of the disc player when said disc player is horizontally oriented, said disc player comprising:

a disc driving mechanism mounted in the disc player for detaching a disc from the disc tray loaded in the disc player in the direction generally perpendicular to the disc face, and for driving a disc;

a disc holding member movable in parallel to the surface of the disc tray between a first position in which the disc holding member does not hold a disc to the disc tray when the disc faces the disc tray and a second position in which the disc holding member holds a disc to the disc tray when the disc faces the disc tray at least when the disc tray is placed outside of the disc player; and disc hold releasing means for disengaging the disc holding member from the disc placed on the disc tray when the disc is separated from the disc tray, wherein:

the disc holding member includes members selectively mounted on three or more corners of the disc tray having a rectangular shape; and two of the holding members are aligned with each other along a loading direction of the disc tray and the disc hold releasing means which bump against their associated disc holding member are staggered in their positions in a direction perpendicular to the surface of the disc placed on the disc tray.

5. A disc player as claimed in any one of claims 1 through 4, further comprising a biasing means for biasing the disc holding member to move into the disc holding position.

6. A disc player as claimed in claims 1 through 4, further comprising a fastening means for fastening the disc holding member at the prescribed position where the disc holding member is releasable.

7. A disc player as claimed in any one of claims 1 through 4, wherein:

said disc tray further comprises a disc receiving portion for receiving the disc, and biasing means for biasing the disc holding member toward the holding position.

8. A disc player as claimed in any one of claims 1 through 4, wherein said disc tray further comprises:

a disc receiving portion for receiving the disc;

a disc interposing member defined on one side of the tray along the tray loading direction for interposing the edge of the disc with the disc receiving portion; and biasing means for biasing the disc holding member toward the holding position.

9. A disc player as claimed in claim 8, further comprising a fastening means for fastening the disc holding member at a prescribed position where the disc holding member is releasable.

10. A disc player as claimed in claim 7, further comprising a fastening means for fastening the disc holding member at a prescribed position where the disc holding member is releasable.

* * * * *